US 7,945,936 B2

(12) United States Patent
Yamagishi et al.

(10) Patent No.: US 7,945,936 B2
(45) Date of Patent: May 17, 2011

(54) MULTICASTING SYSTEM, CLIENT DEVICE, UPPER ROUTER CONTROLLER, METHOD OF DISPLAYING CONTENT AND COMPUTER PROGRAM

(75) Inventors: Yasuaki Yamagishi, Kanagawa (JP); Katsunori Hashimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 614 days.

(21) Appl. No.: 12/024,468

(22) Filed: Feb. 1, 2008

(65) Prior Publication Data
US 2008/0198847 A1 Aug. 21, 2008

(30) Foreign Application Priority Data

Feb. 15, 2007 (JP) ................................. 2007-035427

(51) Int. Cl.
H04N 7/173 (2006.01)
(52) U.S. Cl. .............. 725/97; 725/91; 725/94; 725/119; 725/120
(58) Field of Classification Search .................... 725/86, 725/91, 94, 97, 119, 120
See application file for complete search history.

(56) References Cited

U.S. PATENT DOCUMENTS

| | | | | |
|---|---|---|---|---|
| 6,438,752 B1* | 8/2002 | McClard | | 725/46 |
| 7,352,728 B2* | 4/2008 | Soomro | | 370/338 |
| 2002/0059573 A1* | 5/2002 | Nishio et al. | | 725/1 |
| 2005/0144637 A1* | 6/2005 | Shikata et al. | | 725/35 |
| 2006/0075428 A1* | 4/2006 | Farmer et al. | | 725/38 |
| 2006/0182052 A1* | 8/2006 | Yoon et al. | | 370/312 |
| 2006/0268873 A1* | 11/2006 | Tonjes et al. | | 370/392 |
| 2007/0006256 A1 | 1/2007 | Park et al. | | |
| 2007/0061831 A1* | 3/2007 | Savoor et al. | | 725/13 |
| 2007/0074258 A1* | 3/2007 | Wood et al. | | 725/105 |
| 2007/0147373 A1* | 6/2007 | Yu | | 370/390 |
| 2007/0160038 A1* | 7/2007 | Liu et al. | | 370/389 |
| 2007/0266403 A1* | 11/2007 | Ou et al. | | 725/46 |
| 2008/0022320 A1* | 1/2008 | Ver Steeg | | 725/78 |
| 2008/0049720 A1* | 2/2008 | Liu et al. | | 370/352 |
| 2008/0115182 A1* | 5/2008 | van Willigenburg | | 725/110 |

(Continued)

FOREIGN PATENT DOCUMENTS
EP 1 487 200 A1 12/2004
(Continued)

OTHER PUBLICATIONS

Chunglae Cho, et al., "Improvement of Channel Zapping Time in IPTV Services Using the Adjacent Groups Join-Leave Method", The 6th International Conference on Phoenix Park, vol. 2, XP010702946, Feb. 9, 2004, pp. 971-975.*
U.S. Appl. No. 12/024,474, filed Feb. 1, 2008, Yamagishi.
Jill M. Boyce, et al., "Fast Efficient Channel Change", Digest of Technical Papers, International Conference on Consumer Electronics, IEEE, XP010796400, Jan. 8, 2005, pp. 1-2.

(Continued)

Primary Examiner — Christopher Kelley
Assistant Examiner — Mulugeta Mengesha
(74) Attorney, Agent, or Firm — Oblon, Spivak, McClelland, Maier & Neustadt, L.L.P.

(57) ABSTRACT

A multicasting system includes a delivery server for multicasting a content via at least one upper router and a plurality of lower routers, a plurality of client devices for playing the content multicast by the delivery server and an upper router controller, a content retrieving unit, and a content playing unit. The client device includes an individual storage unit, a content retrieving unit, a content playing unit, a switch time addition unit, and a display controller. The delivery server includes a content delivery unit for delivering each content to the client device. The upper router controller includes a session information retrieving unit, a book scheduling unit, and a schedule information notifier.

16 Claims, 28 Drawing Sheets

U.S. PATENT DOCUMENTS

2008/0134249 A1* 6/2008 Yang et al. .................. 725/46
2008/0216116 A1* 9/2008 Pekonen et al. ............. 725/39

FOREIGN PATENT DOCUMENTS

| EP | 1487200 | * 12/2004 |
| JP | 2003-143587 | 5/2008 |
| WO | WO 2004/051926 A1 | 6/2004 |
| WO | WO 2006/041784 A2 | 4/2006 |

OTHER PUBLICATIONS

Chunglae Cho, et al., "Improvement of Channel Zapping Time in IPTV Services Using the Adjacent Groups Join-Leave Method", The $6^{th}$ International Conference on Phoenix Park, vol. 2, XP010702946, Feb. 9, 2004, pp. 971-975.

* cited by examiner

TIME T

A LOWER ROUTER PARTICIPATES IN A MULTICAST ADDRESS WHICH A CLIENT DEVICE POTENTIALLY SELECTS

PACKET STREAM TO A MULTICAST ADDRESS IN WHICH A LOWER ROUTER PARTICIPATES

PACKET STREAM TO A MULTICAST ADDRESS IN WHICH A LOWER ROUTER PARTICIPATES

TIME T

LOWER ROUTERS PARTICIPATE
IN A MULTICAST ADDRESS WHICH
CLIENT DEVICES POTENTIALLY SELECT

TIME T

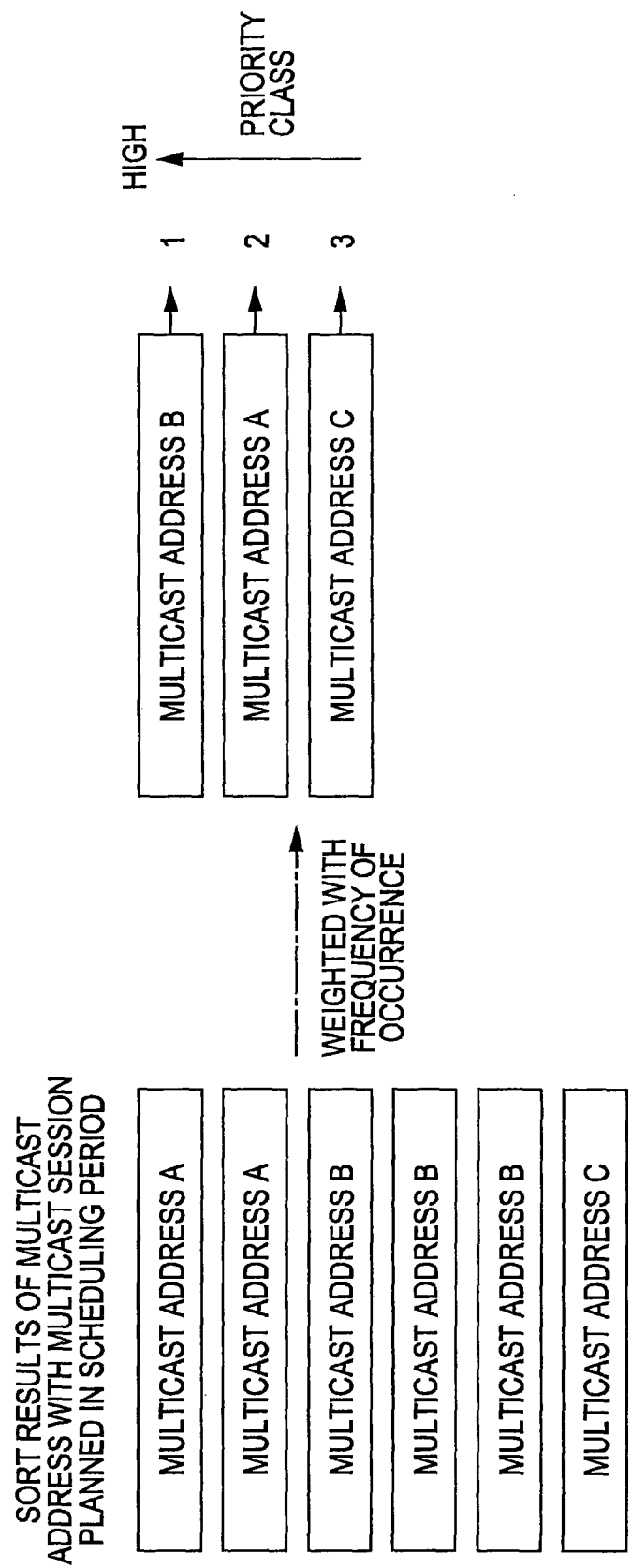

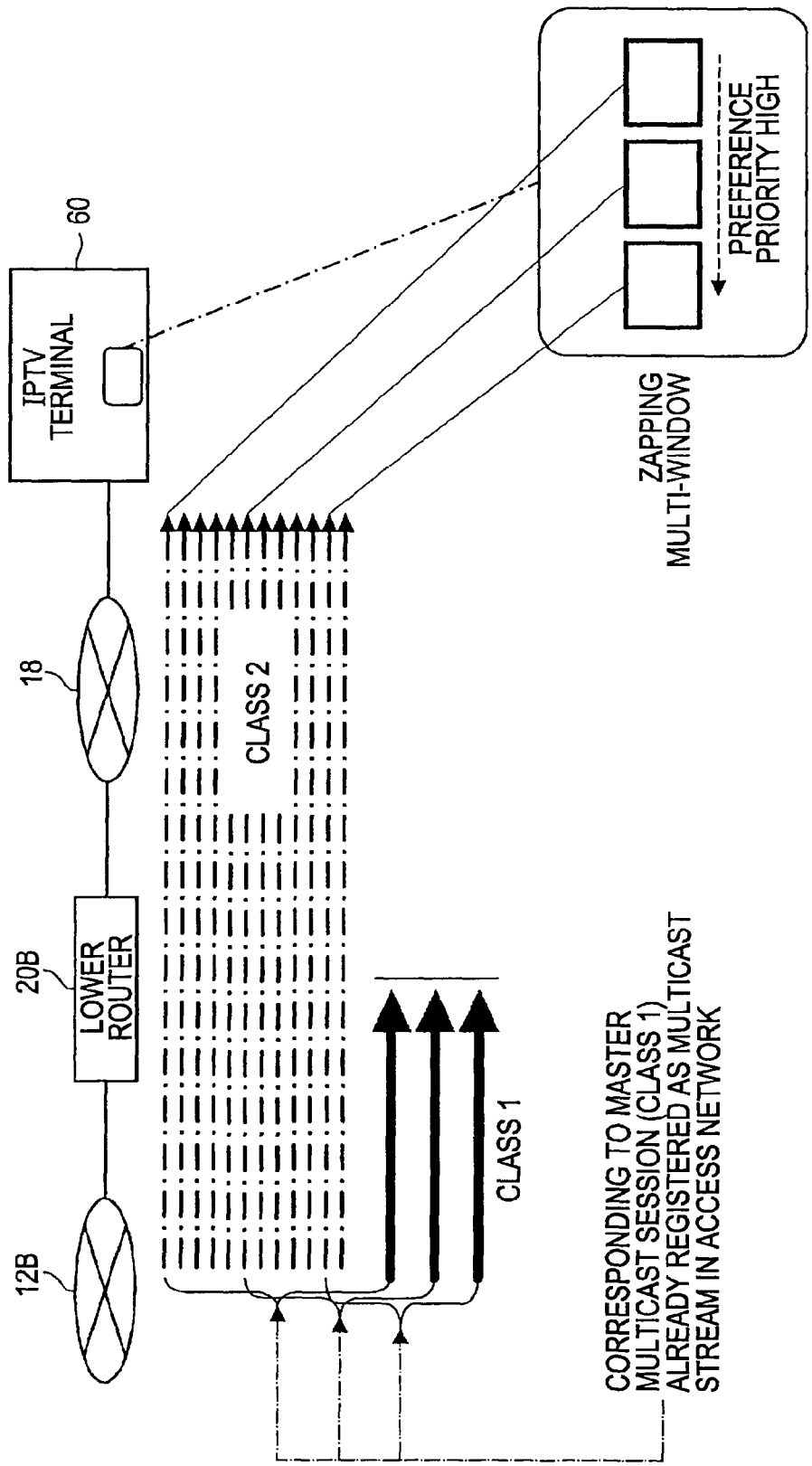

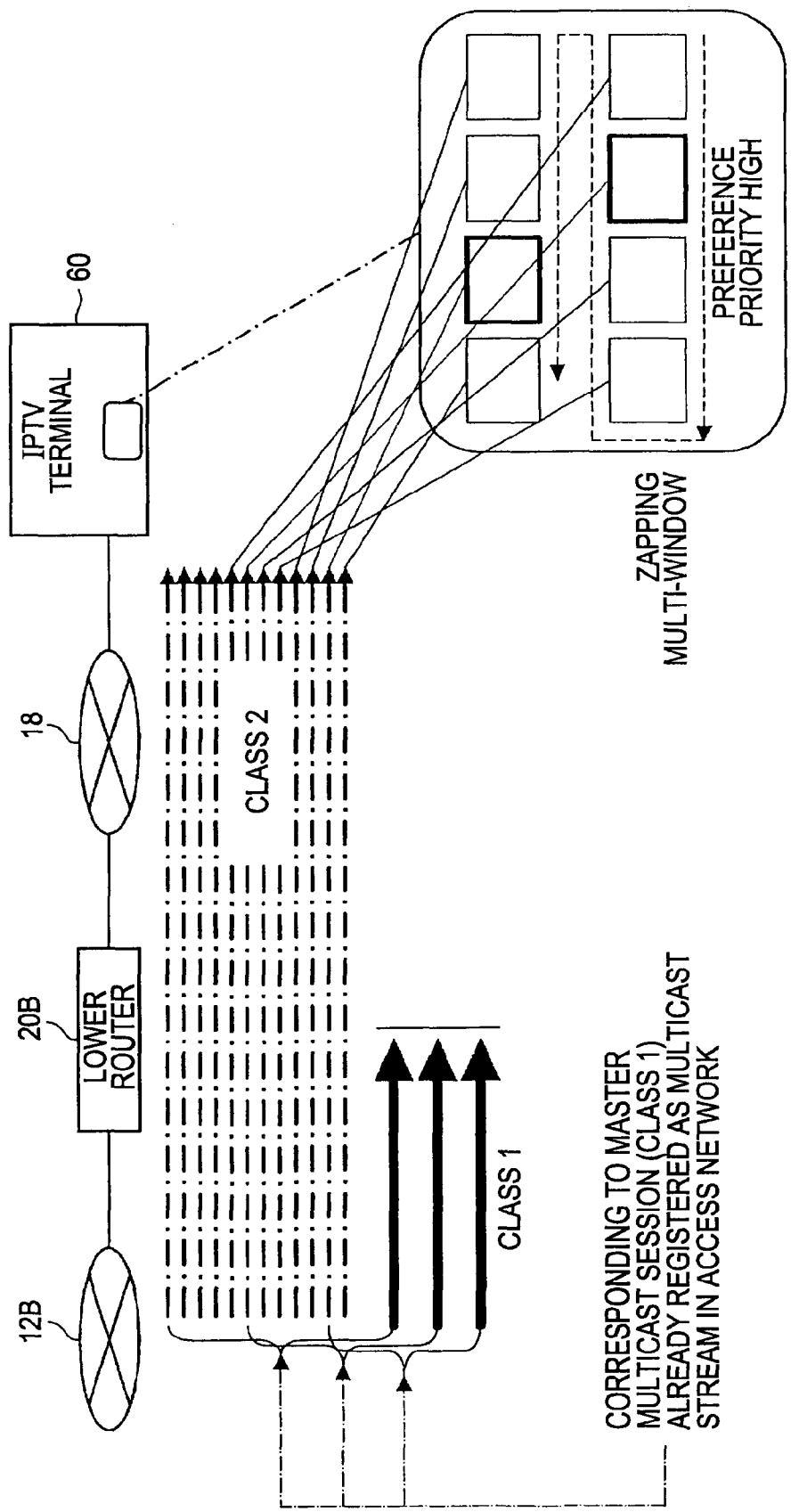

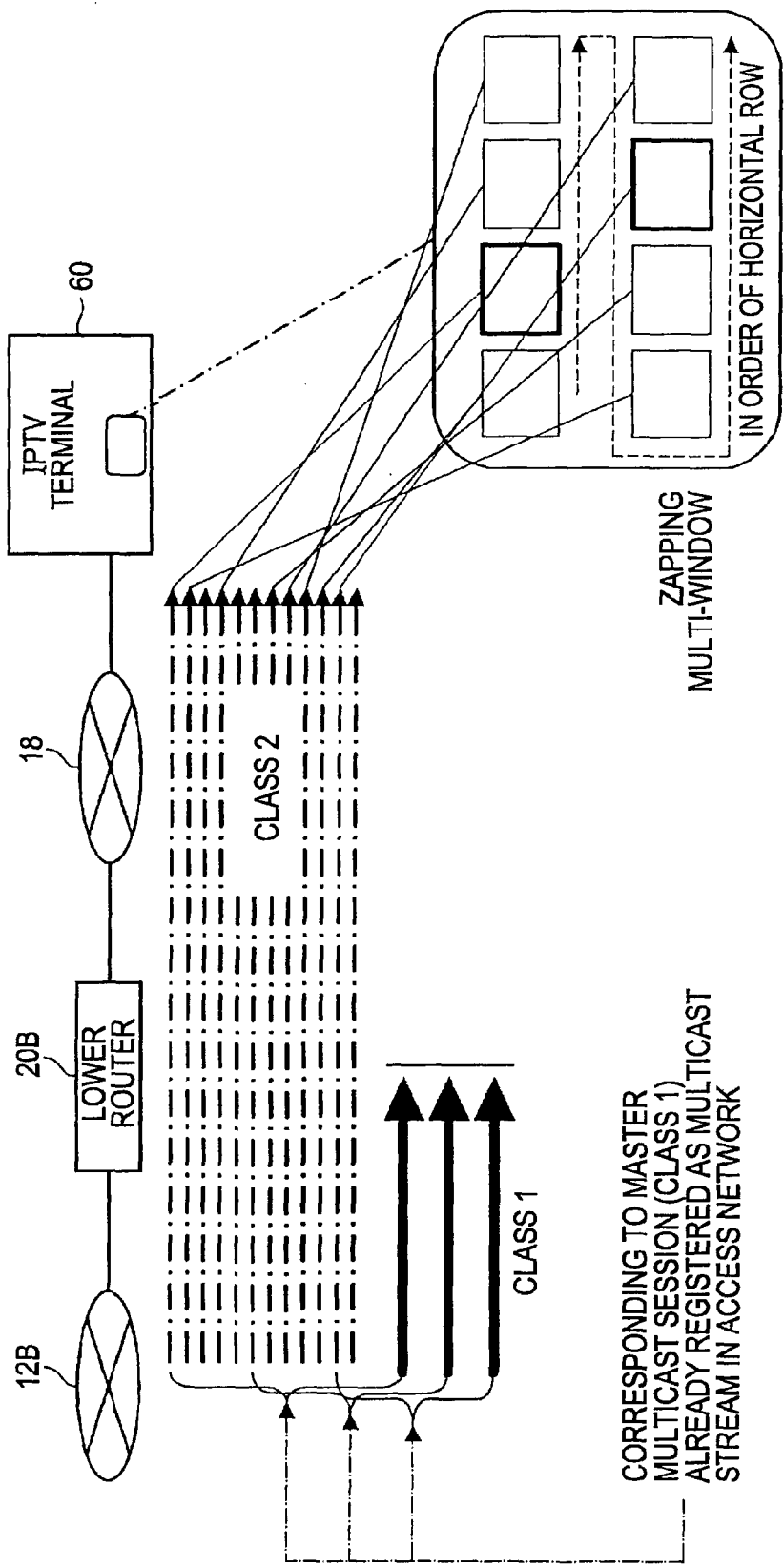

MULTICASTING SYSTEM, CLIENT DEVICE, UPPER ROUTER CONTROLLER, METHOD OF DISPLAYING CONTENT AND COMPUTER PROGRAM

CROSS REFERENCES TO RELATED APPLICATIONS

The present invention contains subject matter related to Japanese Patent Application JP 2007-035427 filed in the Japanese Patent Office on Feb. 15, 2007, the entire contents of which are incorporated herein by reference.

BACKGROUND OF THE INVENTION

1. Field of the Invention

The present invention relates to a multicasting system, a client device, an upper router controller, a content display method and a computer program.

2. Description of the Related Art

With advanced network technology, broadcast programs are delivered via networks. Switching channels and programs takes more waiting time in the delivery of the programs via the networks than in standard radiowave television broadcasting system. High-speed program selection is needed.

Japanese Unexamined Patent Application Publication No. 2003-143587 discloses a technique of predicting a program highly likely to be selected by a terminal and participating beforehand in a multicast group in order to achieve a high-speed program selection.

SUMMARY OF THE INVENTION

The technique disclosed in Japanese Unexamined Patent Application Publication No. 2003-143587 fails to take into consideration scheduling of participating in multicast group over the entire network, and is not able to reduce waiting time for switching programs to a sufficient level. Furthermore, the disclosed technique does not show the waiting time for switching programs in a clearly visible manner.

It is thus desirable to show to the user a channel switch time of a content in a clearly recognizable manner.

In accordance with one embodiment of the present invention, a multicasting system includes a delivery server for multicasting a content via at least one upper router and a plurality of lower routers, a plurality of client devices for playing the content multicast by the delivery server and an upper router controller for controlling the upper router. The client device includes an individual storage unit for storing an identifier of at least part of the contents to be multicast by the delivery server and session information related to multicasting of the content with the identifier mapped to the session information, a content retrieving unit for retrieving the content from the delivery server in accordance with the identifier and the session information of the content stored on the individual storage unit, and a content playing unit for playing the retrieved content. The delivery server includes a content delivery unit for delivering each content to the client device. The upper router controller includes a session information retrieving unit for retrieving from each client device the session information of the content planned to be multicast within a book scheduling period stored on the individual storage unit, a book scheduling unit for determining a priority order of multicast addresses within the book scheduling period in accordance with the retrieved session information and scheduling, based on the determined priority order and a permitted workload of an access network connecting the upper router to the lower router, the multicast addresses in which each lower router participates within the book scheduling period, and a schedule information notifier for notifying each client device of book scheduling information indicating scheduling results of the book scheduling unit. The client device further includes a switch time addition unit for adding, to the session information of the content stored on the individual storage unit, information relating to channel switch time of each content within the book scheduling period in accordance with the book scheduling information, and a display controller for displaying the channel switch time of each content in a recognizable manner within the book scheduling period based on the information relating to the channel switch time.

In accordance with one embodiment of the present invention, a client device receiving and playing a content multicast from a delivery server via an upper router and a lower router, includes an individual content storage unit for storing an identifier of at least part of the contents to be multicast by the delivery server and session information related to multicasting of the content with the identifier mapped to the session information, a content retrieving unit for retrieving the content from the delivery server in accordance with the identifier and the session information of the content stored on the individual storage unit, a content playing unit for playing the retrieved content, a receiver for receiving, from an upper router controller, book scheduling information representing results of scheduling of a multicast address in which the lower router participates within the book scheduling period, in accordance with a priority order of multicast addresses within the book scheduling period and a permitted workload of an access network connecting the upper router to the lower router, the priority order being determined in the upper router controller controlling the upper router in accordance with session information of the content to be multicast within the book scheduling period, the session information stored on the individual content storage unit, a switch time addition unit for adding, to the session information of the content stored on the individual storage unit, information relating to channel switch time of each content within the book scheduling period in accordance with the book scheduling information, and a display controller for displaying the channel switch time of each content in a recognizable manner within the book scheduling period based on the information relating to the channel switch time.

The display controller may display the channel switch time of the contents in a recognizable manner by differentiating, in a display mode, windows for displaying attribute information of each content as a delivery target within the book scheduling period. The attribute information here refers to a content identifier, metadata, a thumbnail, title, etc.

The display controller may display the window corresponding to each content in accordance with the length of the channel switch time.

The display controller may display the window corresponding to each content in the order of multicast addresses.

The display controller may display a moving image of each content within the window.

The display controller may receive from the upper router controller a low image quality content into which the upper router controller has converted a content delivered from the delivery server in terms of image quality and display the low image quality content on the window.

The display controller may display on the window a still image representing each content.

In accordance with one embodiment of the present invention, an upper router controller controls an upper router routing data between a delivery server and a plurality of client devices, the delivery server multicasting a content to each client device via at least one upper router and a plurality of lower routers and the client device executing the content multicast by the delivery server. The upper router controller includes a session information retrieving unit for retrieving, from each of the plurality of client devices, session information of a related content planned to be multicast within a book scheduling period, of session information of related contents highly likely to be executed by the client device, a book scheduling unit for determining a priority order of multicast addresses within the book scheduling period in accordance with the retrieved session information and scheduling, based on the determined priority order and a permitted workload of an access network connecting the upper router to the lower router, the multicast addresses in which each lower router participates within the book scheduling period, and a schedule information notifier for notifying a lower router controller of book scheduling information indicating scheduling results of the book scheduling unit.

The upper router controller may further include a content converter for converting the content delivered from the delivery server into a content occupying a narrow delivery band.

The content converter may generate new session information of the obtained content occupying a narrow delivery band and transmit the generated new session information to the client device.

The content converter may attach, to the session information of the content occupying a narrow delivery band, information indicating that the content occupies a narrow delivery band.

Preferably, the content is a video content and audio data of the video content is not be converted and moving image data of the video content is degraded.

In accordance with one embodiment of the present invention, a method of displaying a channel switch time of a content in a recognizable manner in a client device retrieving the content from a delivery server via a lower router and an upper router and executing the content, includes steps of attaching, to multicast session information of each content stored on each client device, flag information indicating a length of the channel switch time of each content based on book scheduling information transmitted from an upper router controller controlling the upper router, and displaying the channel switch time of the content in a recognizable manner in accordance with the flag information indicating the length of the channel switch time of each content.

In accordance with one embodiment of the present invention, a computer program for causing a computer to control a client device playing a content multicast from a delivery server via an upper router, includes steps of storing an identifier of at least part of the contents to be multicast by the delivery server and session information related to multicasting of the content with the identifier mapped to the session information, retrieving the content from the delivery server in accordance with the identifier and the session information of the stored content, and playing the retrieved content, receiving, from an upper router controller, book scheduling information representing results of scheduling of a multicast address in which a lower router participates within a book scheduling period, in accordance with a priority order of multicast addresses within the book scheduling period and a permitted workload of an access network connecting the upper router to the lower router, the priority order being determined in the upper router controller controlling the upper router in accordance with session information of the content to be multicast within the book scheduling period, the session information stored on the client device, adding, to the stored session information of the content as a multicasting target, information relating to channel switch time of each content within the book scheduling period in accordance with the book scheduling information, and displaying the channel switch time of each content in a recognizable manner within the book scheduling period based on the information relating to the channel switch time.

With the above arrangement, the computer program is stored onto a memory in the computer, read into a central processing unit (CPU) in the computer and then executed. The computer is then operated as the above-described client device. A computer readable recording medium having the computer program recorded thereon may be supplied. The recording medium may be one of a magnetic disk, an optical disk, a magneto-optical disk and a flash memory. The computer program may be delivered via a network without using such a recording medium.

A computer program for causing a computer to control an upper router relaying a content multicast from a delivery server to a client device, includes steps of retrieving, from each of the plurality of client devices, session information of the content planned to be multicast within a book scheduling period, of session information of related contents highly likely to be executed by the client device, determining a priority order of multicast addresses within the book scheduling period in accordance with the retrieved session information and scheduling, based on the determined priority order and a permitted workload of an access network connecting the upper router to the lower router, the multicast addresses in which each lower router participates within the book scheduling period, and notifying a lower router controller of book scheduling information indicating scheduling results.

With the above arrangement, the computer program is stored onto a memory in the computer, read into a central processing unit (CPU) in the computer and then executed. The computer is then operated as the above-described upper router controller. A computer readable recording medium having the computer program recorded thereon may be supplied. The recording medium may be one of a magnetic disk, an optical disk, a magneto-optical disk and a flash memory. The computer program may be delivered via a network without using such a recording medium.

In accordance with embodiments of the present invention, time required to switch channels of contents is displayed in a recognizable manner.

BRIEF DESCRIPTION OF THE DRAWINGS

FIG. 16 illustrates the multicast booking scheduling process in accordance with the first embodiment of the present invention;

FIG. 27A illustrates one example of zapping multi-window in accordance with the second embodiment of the present invention;

FIG. 27B illustrates another example of zapping multi-window in accordance with the second embodiment of the present invention; and FIG. 27C illustrates yet another example of zapping multi-window in accordance with the second embodiment of the present invention.

DESCRIPTION OF THE PREFERRED EMBODIMENTS

Figure 1:
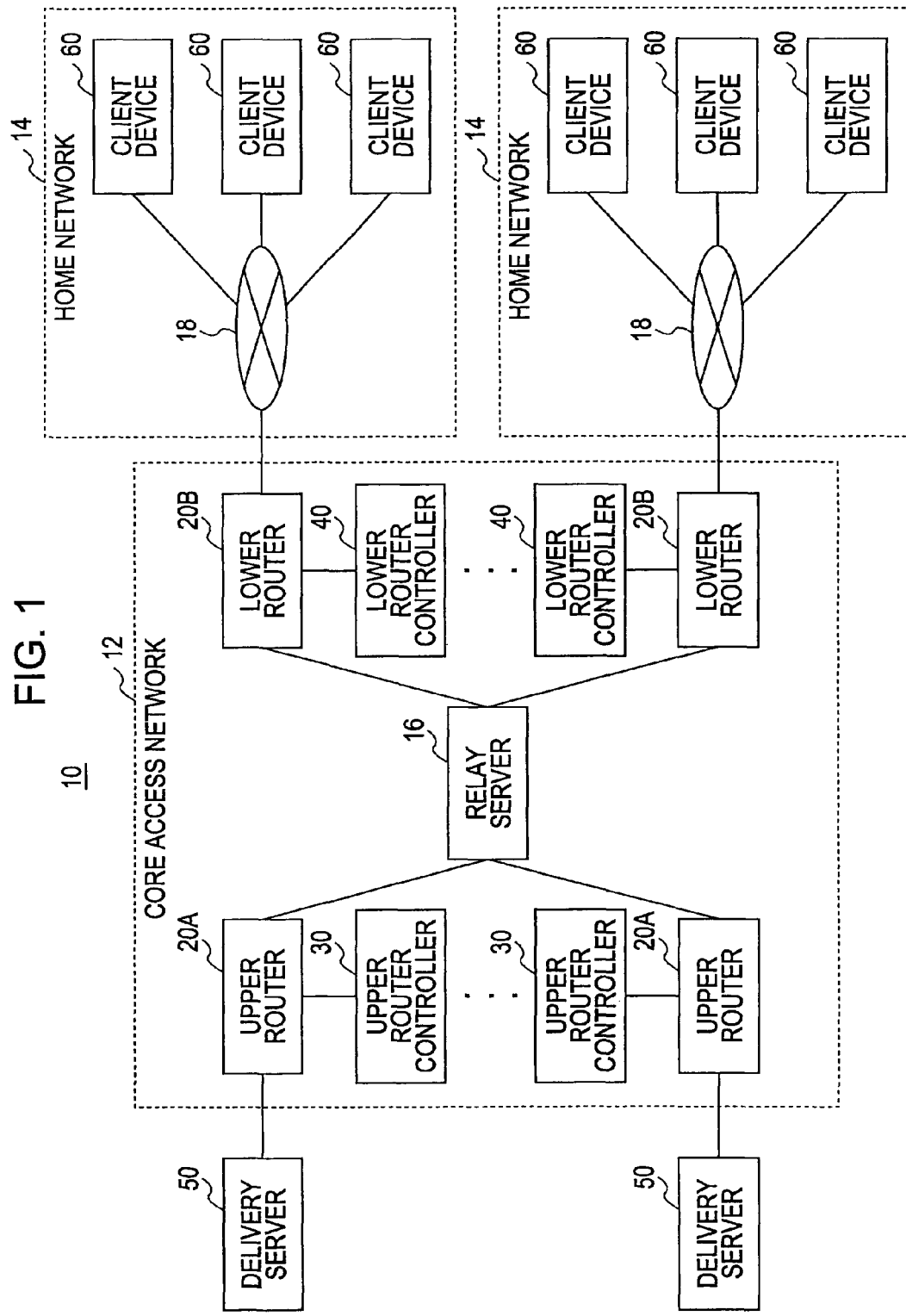
FIG. 1 is a block diagram of a multicasting system in accordance with a first embodiment of the present invention.

Embodiments of the present invention are described below with reference to the drawings. In the following discussion and drawings, like elements having like functions are designated with the same reference numerals and the discussion thereof is not duplicated.

First Embodiment

A multicasting system 10 of a first embodiment of the present invention is described below. FIG. 1 illustrates the multicasting system 10 in accordance with the first embodiment of the present invention. The multicasting system 10 includes a core access network 12, a home network 14 and a delivery server 50.

The term "multicast delivery" means a one-to-multi-point delivery in which a content is delivered from a single delivery server to multiple client devices. A group of programs (contents) multicast is referred to as a multicast group.

The core access network 12 serves as a relay network working between the home network 14 and the delivery server 50. The core access network 12 includes a plurality of routers 20 and a relay server 16 corresponding to the home network 14. The delivery server 50 is linked to the core access network 12 via an upper router 20A while the core access network 12 is linked to the home network 14 via a lower router 20B.

The relay server 16 serves as a relay between the delivery server 50 and the client device 60 using a predetermined communication protocol. The relay server 16 may be arranged over the core access network 12. Alternatively, the relay server 16 may be arranged over one of a core network and an access network. The relay server 16 controls communications between the delivery server 50 and the client device 60, each of which is connected indirectly connected to the relay server 16 via the upper router 20A and the lower router 20B.

A communication network 18 allows a two-way communication or a one-way communication to be performed between the lower router 20B and a plurality of client devices 60. The communication network 18 may be a wired or wireless network. The communication network 18 may include one of Internet, telephone communication network, satellite communication network, public line for multicasting service, wide area network (WAN), local area network (LAN), Internet Protocol-Virtual Private Network (IP-VPN), Ethernet (Registered Trademark), and exclusive line such as wireless LAN. The client device 60 may be directly connected to the lower router 20B via one of a universal serial bus (USB) port, an IEEE 1394 port such as i. Link, a small computer system interface (SCSI) port, and an RS-232C port rather than via the communication network 18.

The routers 20 such as the upper router 20A and the lower router 20B relay data that flows across the multicasting system 10 including the core access network 12, the home network 14 and the delivery server 50. As shown in FIG. 1, a plurality of routers 20 are arranged in the core access network 12. In this specification, a router arranged between the relay server 16 and the delivery server 50 is referred to as the upper router 20A and a router arranged between the relay server 16 and the home network 14 is referred to as the lower router 20B. One terminal of each of the upper router 20A and the lower router 20B is connected to the relay server 16. As shown in FIG. 1, the upper routers 20A and the lower routers 20B are connected to a single relay server 16. The present invention is not limited to this arrangement. For example, the upper routers 20A and the lower routers 20B may be connected to a plurality of relay servers 16. As shown in FIG. 1, one upper router 20A is connected to one delivery server 50. Alternatively, a plurality of delivery servers 50 may be connected to a single upper router 20A.

The upper router 20A is controlled by the upper router controller 30 connected thereto. The lower router 20B is controlled by the lower router controller 40 connected thereto. In response to a request from the relay server 16, the upper router controller 30 and the delivery server 50 controls respective routers so that data flows smoothly over the multicasting system 10 of the first embodiment of the present invention. FIG. 1 illustrates one upper router 20A controlled by a single upper router controller 30. The present invention is not limited to this arrangement. For example, a single upper router controller 30 may control a plurality of upper routers 20A. Similarly, a single lower router controller 40 may control a plurality of lower routers 20B.

The upper router controller 30 of the first embodiment of the present invention is external to the upper router 20A. The present invention is not limited to this arrangement. For example, the function of the upper router controller 30 may be integrated into the upper router 20A. Similarly, the function of the lower router controller 40 may be integrated into the lower router 20B.

The delivery server 50 manages data of a multicast content such as an Internet Protocol Television (IPTV) content. In response to a request from the client device 60, the delivery server 50 delivers a media stream of audio and video of a multicast content to the client device 60. The delivery server 50 may be a content providing server such as an IPTV server or a broadcasting station. The delivery server 50 will be described in detail later.

The client device 60 such as an IPTV terminal receives a multicast content such as an IPTV content and executes the received content. As shown in FIG. 1, three client devices 60 are connected to a single home network 14. The present invention is not limited to this arrangement. For example, one client device 60 may be connected to a single home network 14 or four or more client devices 60 may be connected to a single home network 14.

Any type of client device is acceptable for the client device 60 as long as the client device has a network communication function and can execute the multicast content. For example, the client device 60 may be one of a personal computer (a notebook computer or a desktop computer), a television receiver, a cellular phone, a personal digital assistant (PDA), a tuner for television receiver and a decoder. The client device 60 may also be a portable device of a subscriber, such as one of a mobile game playing machine, a personal handyphone system (PHS), a mobile audio/video player. The client device 60 will be described in detail later.

Figure 2:
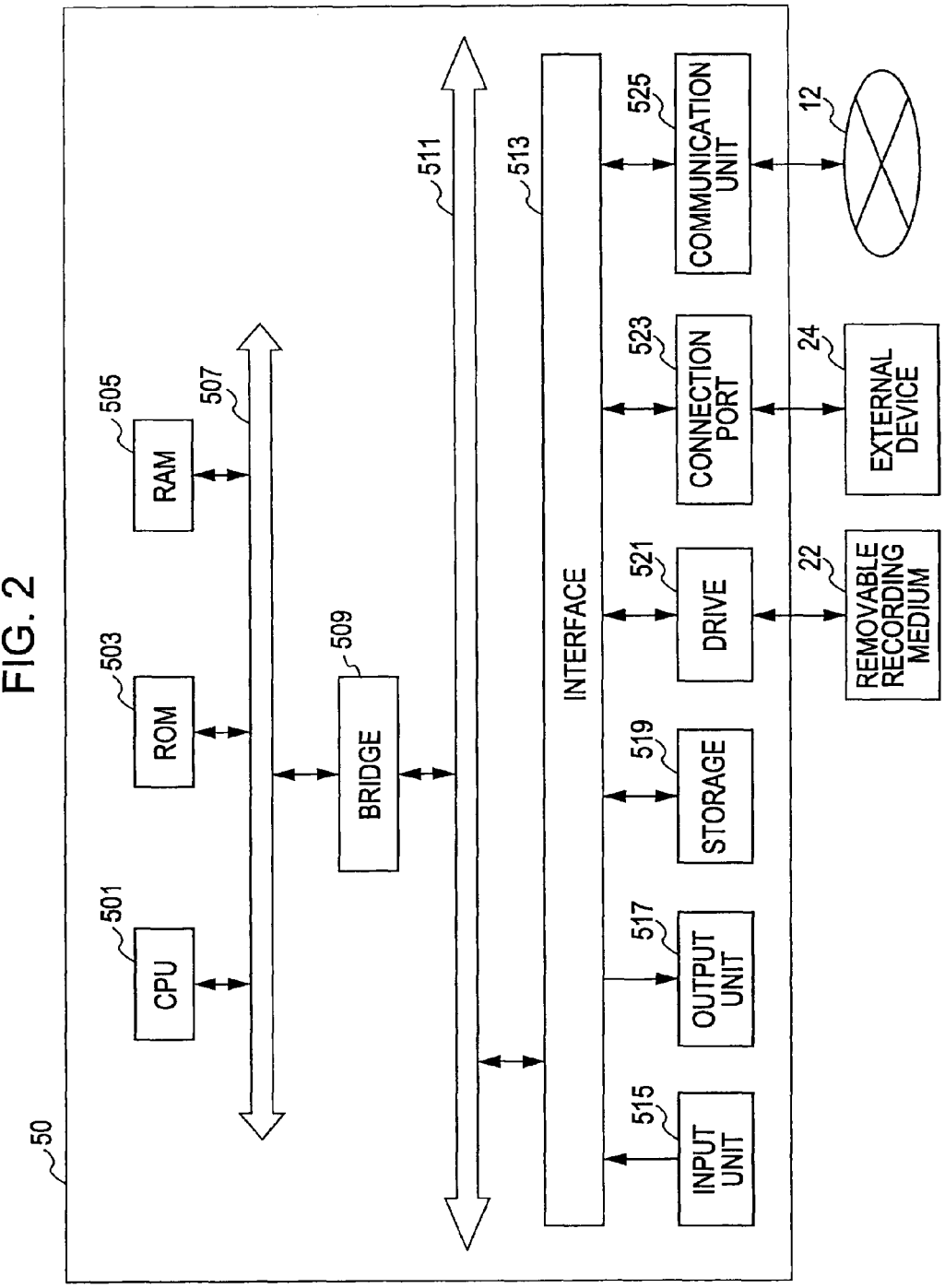
FIG. 2 illustrates a hardware structure of a delivery server in accordance with the first embodiment of the present invention.

FIG. 2 illustrates a hardware structure of the delivery server 50 of the first embodiment of the present invention. The delivery server 50 includes as major elements a central processing unit (CPU) 501, a read-only memory (ROM) 503, a random-access memory (RAM) 505, a host bus 507, a bridge 509, an external bus 511, an interface 513, an input unit 515, an output unit 517, a storage 519, a drive 521, a connection port 523 and a communication unit 525.

The CPU 501 functions as an arithmetic device and a control device and controls the delivery server 50 in whole or in part in accordance with a variety of programs stored on one of the ROM 503, the RAM 505, the storage 519 and the removable recording medium 22. The ROM 503 stores a program used by the CPU 501 and parameters changing in the course of execution of the program. These elements are interconnected by the host bus 507 including internal buses such as a CPU bus.

The host bus 507 is connected to the external bus 511 such as a peripheral component interconnect/interface (PCI) bus via the bridge 509.

The input unit 515 is operating means operated by a user, such as one of a mouse, a keyboard, a touchpanel, a button, a switch and a lever. The input unit 515 may also be remote control means employing infrared wave or other radiowaves. Alternatively, the input unit 515 may be an external device 24, such as the cellular phone or PDA, responding to the delivery server 50 or may be the client device 60. The input unit 515 may include an input control unit generating an input signal in response to information input on the operating means by the user and outputting the input signal to the CPU 501. By operating the input unit 515, the user of the delivery server 50 inputs a variety of data onto the delivery server 50 and issues a variety of commands.

The output unit 517 may be one of a cathode ray tube (CRT) display, a liquid-crystal display (LCD), a plasma display panel (PDP), an electro-luminescent (EL) display, a display composed of lamps, an audio output unit such as a loudspeaker or a headphone, a printer, a cellular phone and a facsimile machine. The output unit 517 thus coveys acquired information to the user visibly and/or audibly.

The storage 519 is a data storage device as a part of the delivery server 50 of the first embodiment of the present invention. The storage 519 may be one of a magnetic recording device such as a hard disk drive (HDD), semiconductor memory device, an optical memory device and a magnetooptical device. The storage 519 stores the program performed by the CPU 501 and a variety of data, a content, content information required to execute the content, metadata of the content and content data acquired from the outside.

The drive 521 is a recording medium reader/writer and may be arranged external or internal to the delivery server 50. The drive 521 reads information recorded on the removable recording medium 22, such as a magnetic disk, an optical disk, a magneto-optical disk or a semiconductor memory and outputs the read information to the RAM 505. The drive 521 also writes information onto the removable recording medium 22, such as a magnetic disk, an optical disk, a magneto-optical disk or a semiconductor memory. The removable recording medium 22 may be one of a digital versatile disk (DVD), an HD-DVD disk, a Blu-ray disk, a CompactFlash (CF) memory, and a memory stick and secure digital (SD) memory card. The removable recording medium 22 may be an integrated circuit (IC) card having a contactless IC chip or an electronic device.

The connection port 523 is used to connect the external device 24 directly to the delivery server 50. The connection port 523 may be one of a universal serial bus (USB) port, an IEEE 1394 port such as i. Link, a small computer system interface (SCSI) port, an RS-232C port and an optical audio terminal. With the external device 24 directly connected to the connection port 523, the delivery server 50 retrieves the content data from the external device 24 or supplies a variety of data to the external device 24.

The communication unit 525 is a communication interface composed of a communication device for connection to communication network or the core access network 12. The communication unit 525 may be one of a wired or wireless LAN communication card, a Bluetooth communication card, a wireless USB (WU) communication card, an optical communication router, an asymmetrical digital subscriber line (ADSL) router, and one of a variety of communication modems. The communication unit 525 exchanges a content and/or information relating to the content with the client device 60. The communication unit 525 also exchanges a content and/or metadata related to the content with the Internet or another communication device. Each of the communication network and the core access network 12 connected to the IPTV server 50 is constructed of a wired or wireless network. Each of the communication network and the core access network 12 may be one of the Internet, a home LAN, an infrared communication network or a satellite communication network.

With the above-referenced configuration, the delivery server 50 transmits a variety of information to and receive a variety of information from various information sources such as the relay server 16 and the client device 60. The delivery server 50 retrieves information thereof from the removable recording medium 22. A preferred multicasting system is thus configured using the delivery server 50 and the client device 60 communicating with each other.

The upper router controller 30, the lower router controller 40 and the client device 60 are substantially identical in hardware structure to the delivery server 50 and the discussion thereof is omitted herein.

The hardware structure performing the function of each of the upper router controller 30, the lower router controller 40, the delivery server 50 and the client device 60 has been discussed. Any widely available component may be employed to construct each of these units. A hardware structure dedicated to a function of a particular element may be used. The hardware structure may be appropriately modified depending on the technical level available when the embodiment is implemented. The above-referenced hardware structure has been discussed for exemplary purposes only and the present invention is not limited to such a hardware structure. Depending on the mode of use, one of the host bus 507, the external bus 511 and the interface 513 may be omitted.

Figure 3:
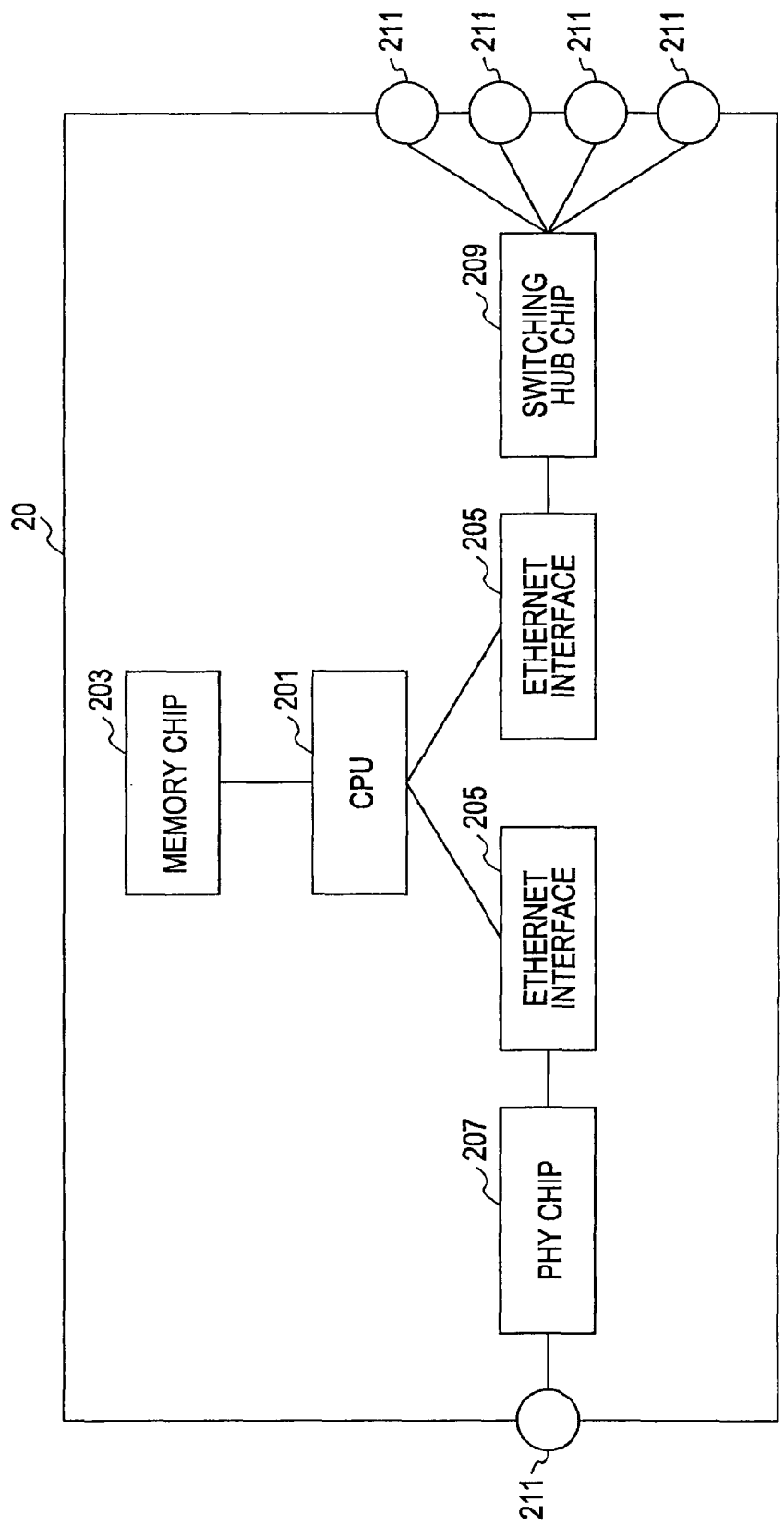
FIG. 3 illustrates a hardware structure of multicast router in accordance with the first embodiment of the present invention.
Figure 4A:
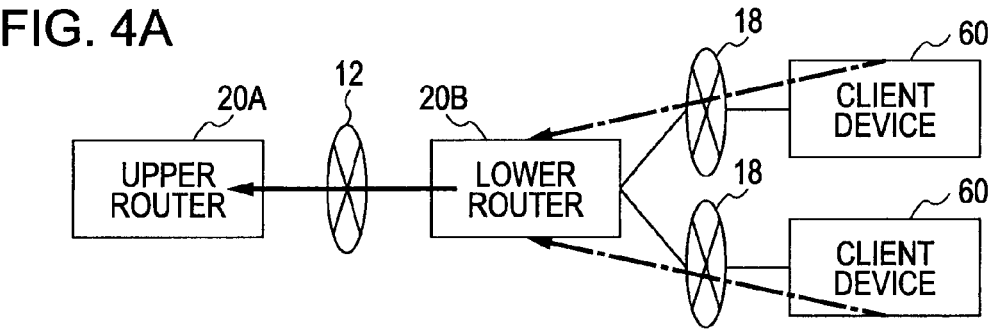
FIGS. 4A-4D illustrate a content delivery system based on a underlying technique of embodiments of the present invention.
Figure 4B:
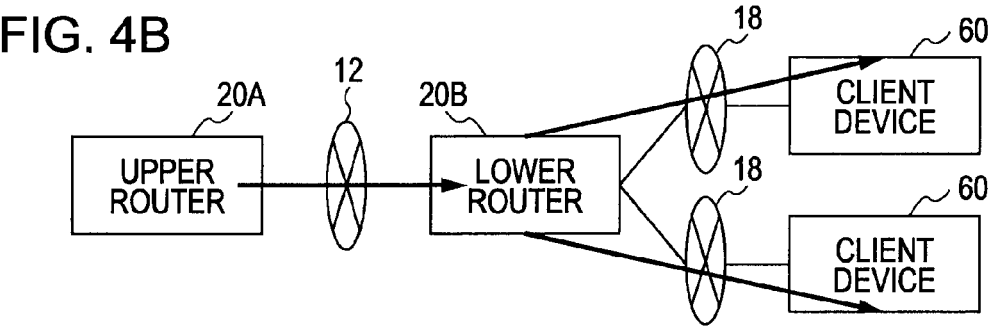
Figure 4C:
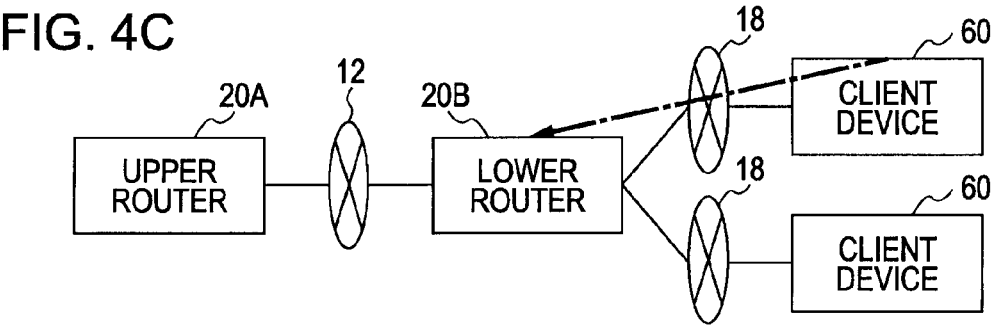
Figure 4D:
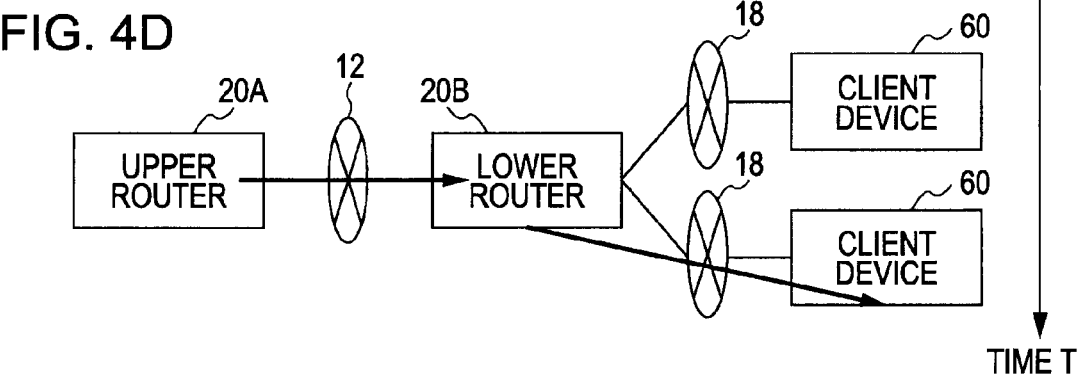

FIG. 3 illustrates a hardware structure of the router 20 such as the upper router 20A and the lower router 20B in accordance with the first embodiment of the present invention. The router 20 includes a CPU 201, a memory chip 203 composed of a ROM and a RAM, Ethernet interfaces 205, a physical layer (PHY) chip 207, a switching hub chip 209 and connection ports 211.

The CPU 201, functioning as an arithmetic unit and a control unit, controls the router 20 in whole or in part in accordance with a program stored on the memory chip 203 composed of the ROM and the RAM and thus performs a routine process of an IP packet. The ROM forming the memory chip 203 stores a program used by the CPU 201 and arithmetic parameters. The RAM forming the memory chip 203 stores temporarily a program used by the CPU 201 and parameters changing in the course of the execution of the program. These elements are interconnected to each other via a host bus including an internal bus such as a CPU bus.

The Ethernet interface 205 serves as an interface between a transfer format of a variety of data outside the router 20 and a transfer format of data within the router 20. As shown in FIG. 3, two Ethernet interfaces 205 are used. The Ethernet interface 205, arranged between the CPU 201 and the PHY chip 207 to be discussed later, relays data transmitted from outside the router 20 to inside the router 20. The Ethernet interface 205, arranged between the CPU 201 and the switching hub chip 209 to be discussed later, relays data from inside the router 20 to outside the router 20. As shown in FIG. 3, the router 20 includes two Ethernet interfaces 205. The present invention is not limited to this arrangement. A single Ethernet interface 205 may perform the above-referenced process.

The PHY (PHYsical layer) chip 207 stores information relating to physical connection and transmission method of a network connected to the router 20. For example, the stored information relates to conversion method of data and electrical signals. The PHY chip 207 is arranged between a connection port 211 upstream of the router 20 and the Ethernet interface 205.

The switching hub chip 209 serves as a data switching hub. The switching hub chip 209 analyzes data received by the multicast router 20, detects a destination of the received data and then transfers data to only an appropriate connection port 211 in accordance with a destination MAC address, for example. The switching hub chip 209 is arranged between the connection ports 211 downstream of the multicast router 20 and the Ethernet interface 205.

The hardware structure performing the function of the router 20 of the first embodiment of the present invention has been discussed. A hardware structure dedicated to a function of a particular element may be used. The hardware structure may be appropriately modified depending on the technical level available when the embodiment is implemented. The above-referenced hardware structure has been discussed for exemplary purposes only and the present invention is not limited to such a hardware structure.

An underlying technique of the embodiments of the present invention is described below before describing the embodiments of the present invention. The embodiments of the present invention have been developed by improving the underlying technique described below. The embodiments of the present invention improvement feature the underlying technique. The embodiments of the present invention are based on the underlying technique, but the essential portion of the embodiments lies in the improvement. The embodiments of the present invention and the underlying technique are different in configuration and the embodiments of the present invention have a substantial advantage over the underlying technique.

FIGS. 4A-4D illustrate a client device related to the underlying technique of the present invention. IPTV service is described below. The IPTV service is expected to advance as a core application on a next generation Internet protocol (IP) network realized with IP multimedia subsystem (IMS)/next generation network (NGN).

As shown in FIGS. 4A-4D, the multicasting system related to the underlying technique of the embodiments of the present invention includes the core access network 12, the upper router 20A arranged upstream of the core access network 12, namely, on the side of the delivery server 50 as the IPTV server (not shown) and the lower router 20B arranged downstream of the core access network 12, namely, on the side of the home network 14. The lower router 20B on the side of the home network 14 connects to an IPTV terminal 60 as the client device via the home network 14.

Multicast protocol is used as an IP multicast method of typical IPTV. The router 20 supporting the IP multicast protocol uses a multicast group management protocol such as Internet group management protocol (GMP) or the like to manage the presence of the IPTV terminal 60 as a client participating in each multicast group on a network segment connected thereto.

The IPTV terminal 60 receiving the multicast data designates a multicast address at which a desired multicasting is performed, and declares participation in the multicast group to the lower router 20B as a multicast router in accordance with the multicast group management protocol. Upon receiving a multicast packet from the upper router 20A forming a multicast tree, the lower router 20B sends the packet to the home network 14 only when the IPTV terminal 60 participating in the multicast group is present on the home network 14 as a network segment connected to the lower router 20B. To stop receiving the multicast packet, the IPTV terminal 60 declares disengagement from the multicast group to the lower router 20B.

The lower router 20B is arranged on the border between the home network 14 and the core access network 12 and the IPTV terminal 60 is arranged over the communication network 18. When selection/switching (channel switching) of an IP multicast stream is performed by the IPTV terminal 60, participation/disengagement of the lower router 20B to the multicast group is performed. The participation/disengagement process typically takes time, and screen becomes cut off at each switching. Any user, who is accustomed to frequent channel switching (hereinafter also referred to as channel zapping), cannot tolerate such a slow response.

Figure 5A:
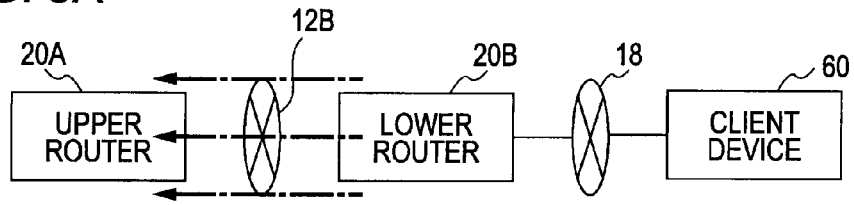
FIGS. 5A-5C illustrate the content delivery system based on the underlying technique of embodiments of the present invention.
Figure 5B:
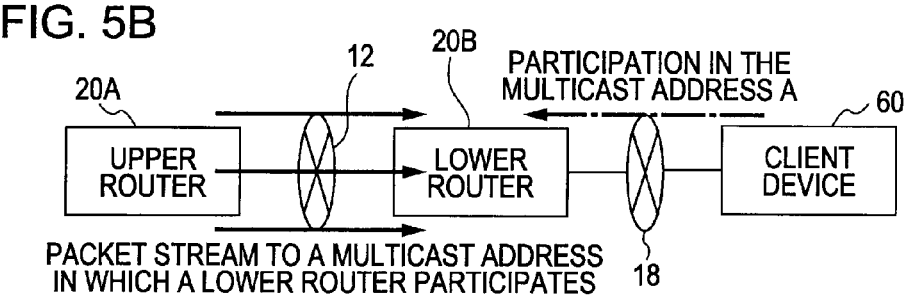
Figure 5C:
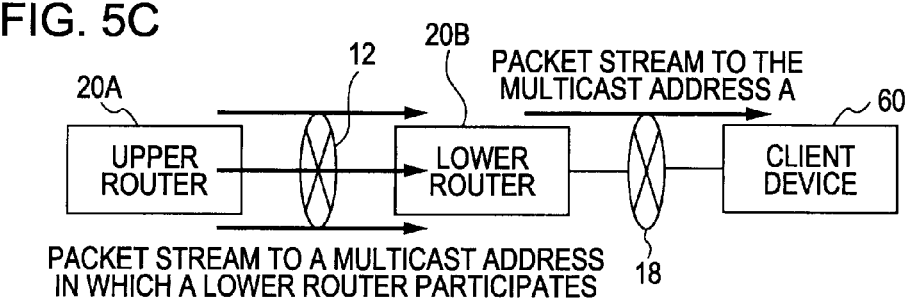

One method of reducing a switching overhead to a multicast tree higher than the lower router 20B (switching waiting time of the multicast tree) is contemplated. In this method, as shown in FIGS. 5A-5C, an intelligent lower router 20B participates beforehand in a multicast group supporting a plurality of channels likely to be selected by the user of the IPTV terminal 60 over the home network 14 connected to the intelligent lower router 20B (for example, a multicast group supporting tens of channels).

Figure 6A:
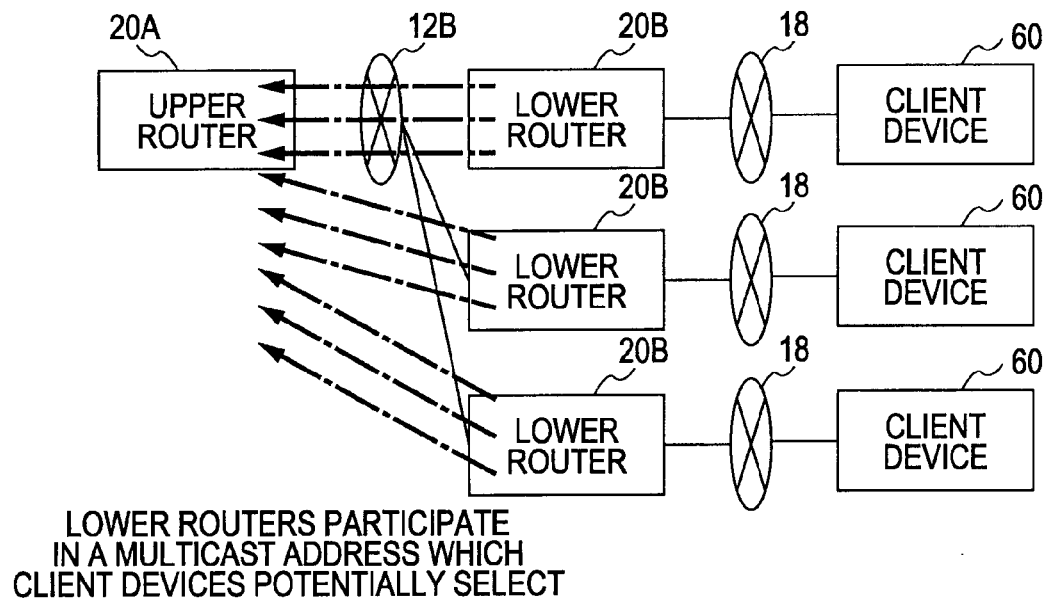
FIGS. 6A and 6B illustrate the content delivery system based on the underlying technique of embodiments of the present invention.
Figure 6B:
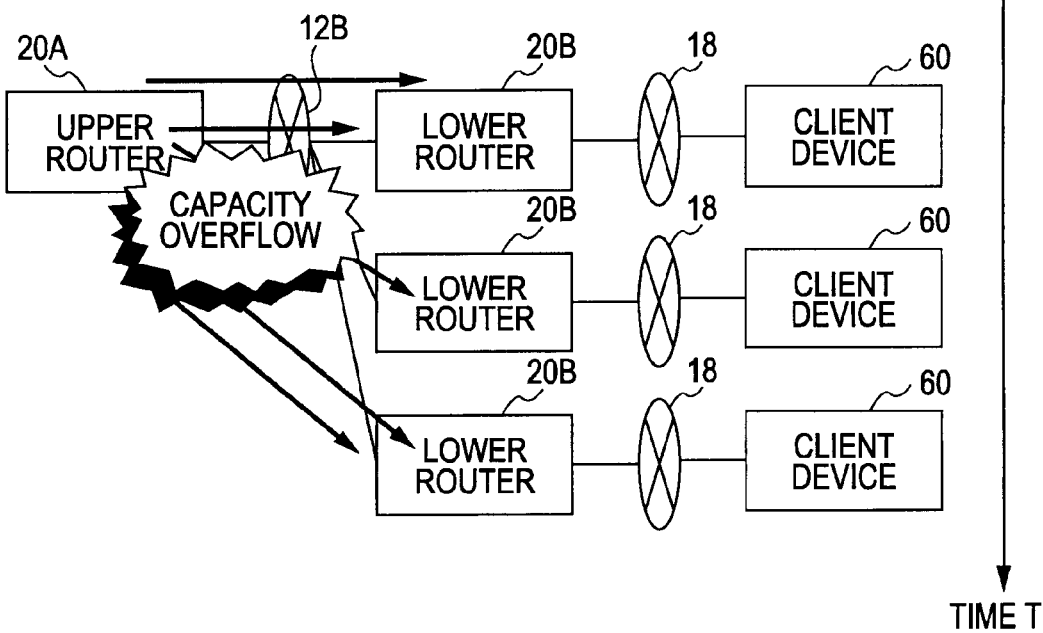

With this method, the number of multicast groups the router needs to participate in increases as the number of multicast routers to be connected to the access network increases (even if some of multicast streams are shared by a plurality of multicast routers with different multicast routers participating in the same multicast address) as shown in FIGS. 6A and 6B. Since numerous multicast streams flow constantly over the access network, a large workload is imposed on the network. A capacity overflow takes place, leading to slow response.

It is desirable to restrict the number of multicast streams constantly flowing across the access network and the overhead of the channel zapping (waiting time caused by channel switching). To this end, the multicast groups in which individual multicast routers participate are prioritized. A multicast group likely to be selected by the user is selected, and the multicast router participates beforehand in that multicast group.

In accordance with embodiments of the present invention, a content reference identifier (CRID) inferred and optimized based on the metadata of each content collected from a view history of a user is used in priority control in combination with optimization of book scheduling of the multicast router to the multicast group. Channel zapping with small overhead (waiting time) is thus achieved. By accounting for optimized scheduling information in an individual content identifier stored on the IPTV terminal 60, channel switching overhead is predicted (as to whether channel switching is slow or not).

In the discussion that follows, an IPTV server for delivering an Internet protocol television (IPTV) content is described as one example of the delivery server 50 and IPTV terminal executing the IPTV content is described as one example of the client device 60.

Figure 7:
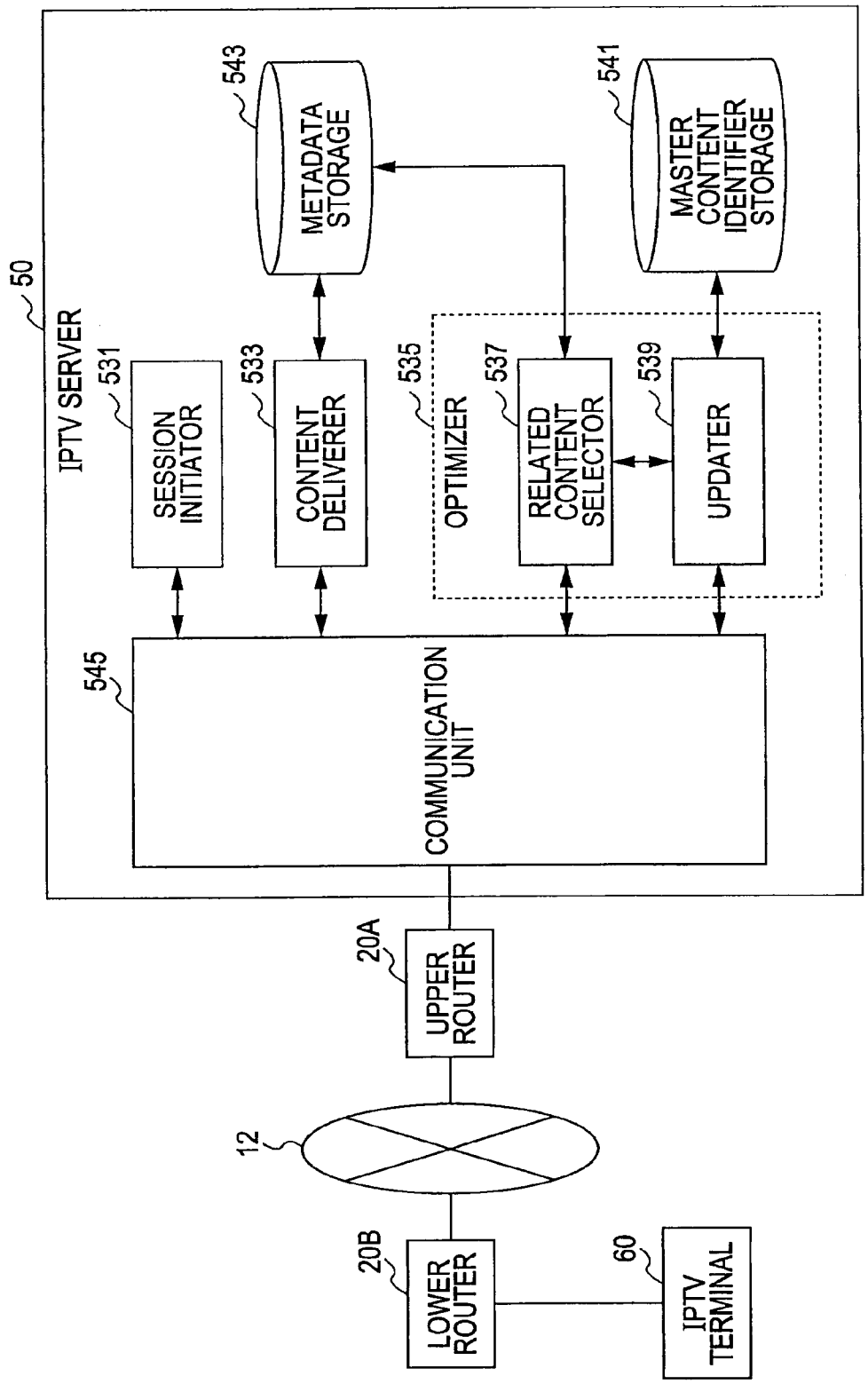
FIG. 7 is a block diagram illustrating a delivery server in accordance with the first embodiment of the present invention.

With reference to FIG. 7, the IPTV server as the delivery server 50 is described below. The delivery server 50 plays an important role in the multicasting system 10 of the first embodiment of the present invention. FIG. 7 illustrates a structure of the delivery server 50 of the first embodiment of the present invention.

The delivery server 50 of the first embodiment of the present invention includes a session initiator 531, a content deliverer 533, an optimizer 535, a master content identifier storage 541, a metadata storage 543 and a communication unit 545.

The session initiator 531 creates a session with the client device 60 as the IPTV terminal arranged in the core access network 12 and terminates the initiated session. The creation/termination of the session is performed based on a predetermined protocol such as Session Initiation Protocol (SIP) protocol.

The content deliverer 533 responds to a content delivery request from the client device 60 as the IPTV terminal, thereby referencing the metadata storage 543 to be described later and delivering a content to the client device 60. The content delivery is performed using a band established between the delivery server 50 and the client device 60 by the session initiator 531.

The optimizer 535 retrieves, from a play history storage 613 in the client device 60, play history information related to a content executed by the client device 60 and optimizes an individual content identifier storage 611 in the client device 60 using the play history information. The optimizer 535 further includes a related content selector 537 and an updater 539.

Via the communication unit 545 to be discussed later, the related content selector 537 retrieves the play history information containing information relating to the content executed by the client device 60. Based on the retrieved play history information, the related content selector 537 selects a related content related to the content executed by the client device 60.

The updater 539 retrieves a content identifier and session information of the related content selected by the related content selector 537 by referencing the master content identifier storage 541. The updater 539 updates a individual content identifier storage 611 in the client device 60 using the content identifier and the session information of the retrieved related content.

The related content selector 537 and the updater 539 are described further in detail below.

The master content identifier storage 541 stores a plurality of pieces of content identifier information (CRID information) related to contents to be delivered. The content identifier information maps the content identifier of each content to be delivered to a multicast session description corresponding to the content identifier. As described above, the updater 539 in the optimizer 535 retrieves the content identifier and the session information of the related content selected by the related content selector 537 by referencing the master content identifier storage 541.

Figure 9:
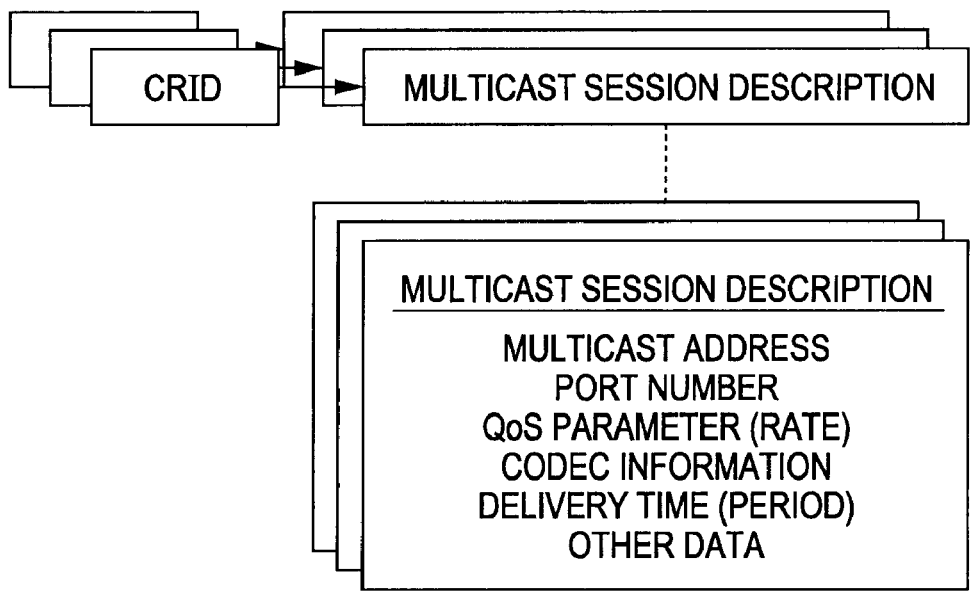
FIG. 9 illustrates content identifier information in accordance with the first embodiment of the present invention.

FIG. 9 illustrates the content identifier information stored on the master content identifier storage 541. As shown in FIG. 9, the content identifier information (CRID information) contains the content identifier of each content and the multicast session description mapped to each content. The multicast session description is described in accordance with a predetermined protocol such as session description protocol (SDP). As shown in FIG. 9, the multicast session description contains a session description of a multicast content (information identifying each session), time description (session effective times such as start and stop times of the session and the number of repetitions of the session) and media description (information related to the medium). The session description of the multicast content contains an address of the multicast content (multicast address), port number, QoS parameters such as request rate, codec information and delivery time. Codec identification information is a sort of metadata and a content retrieval path and the like can be known by referencing the content identification information based on the content identifier. A plurality of class session descriptions such as a high-quality image mode and a low-quality image mode may be mapped to a single content identifier.

The metadata storage 543 stores the metadata of the multicast content to be delivered to the client device 60 with the content identifier mapped to the metadata. Upon receiving a content delivery request from the client device 60, the content deliverer 533 delivers the multicast content to the client device 60 while referencing the metadata storage 543.

Figure 10:
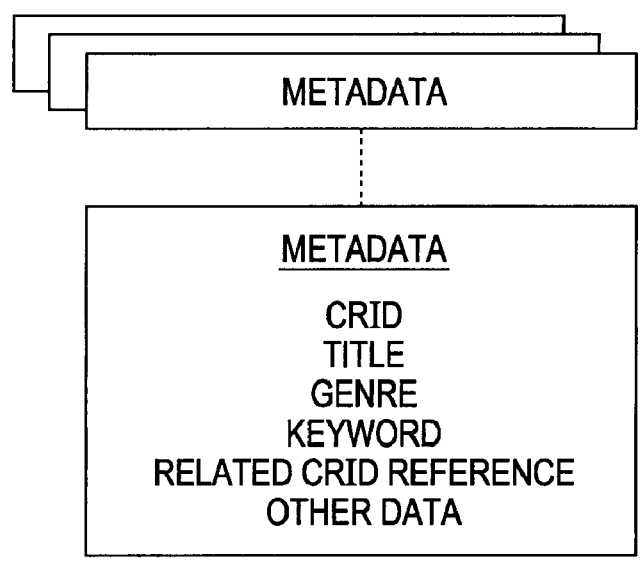
FIG. 10 illustrates metadata in accordance with the first embodiment of the present invention.

As shown in FIG. 10, the metadata stored on the metadata storage 543 contains a content identifier (CRID) unique to each multicast content, a keyword and a genre of the multicast content and a content identifier of the content (related content) related to the multicast content.

The communication unit 545 transmits via the core access network 12 a variety of information to be disclosed to the client device 60 by each of the session initiator 531, the content deliverer 533, the related content selector 537 and the updater 539. The communication unit 545 allows the delivery server 50 to receive a request, etc., from the IPTV terminal 60.

The delivery server 50 of the first embodiment of the present invention may further include a storage (not shown) and may store, on that storage, video data and audio data as the multicast content to be delivered. In FIG. 7, the master content identifier storage 541 and the metadata storage 543 are illustrated as separate units. The delivery server 50 of the first embodiment of the present invention may include a storage containing the master content identifier storage 541 and the metadata storage 543.

Figure 8:
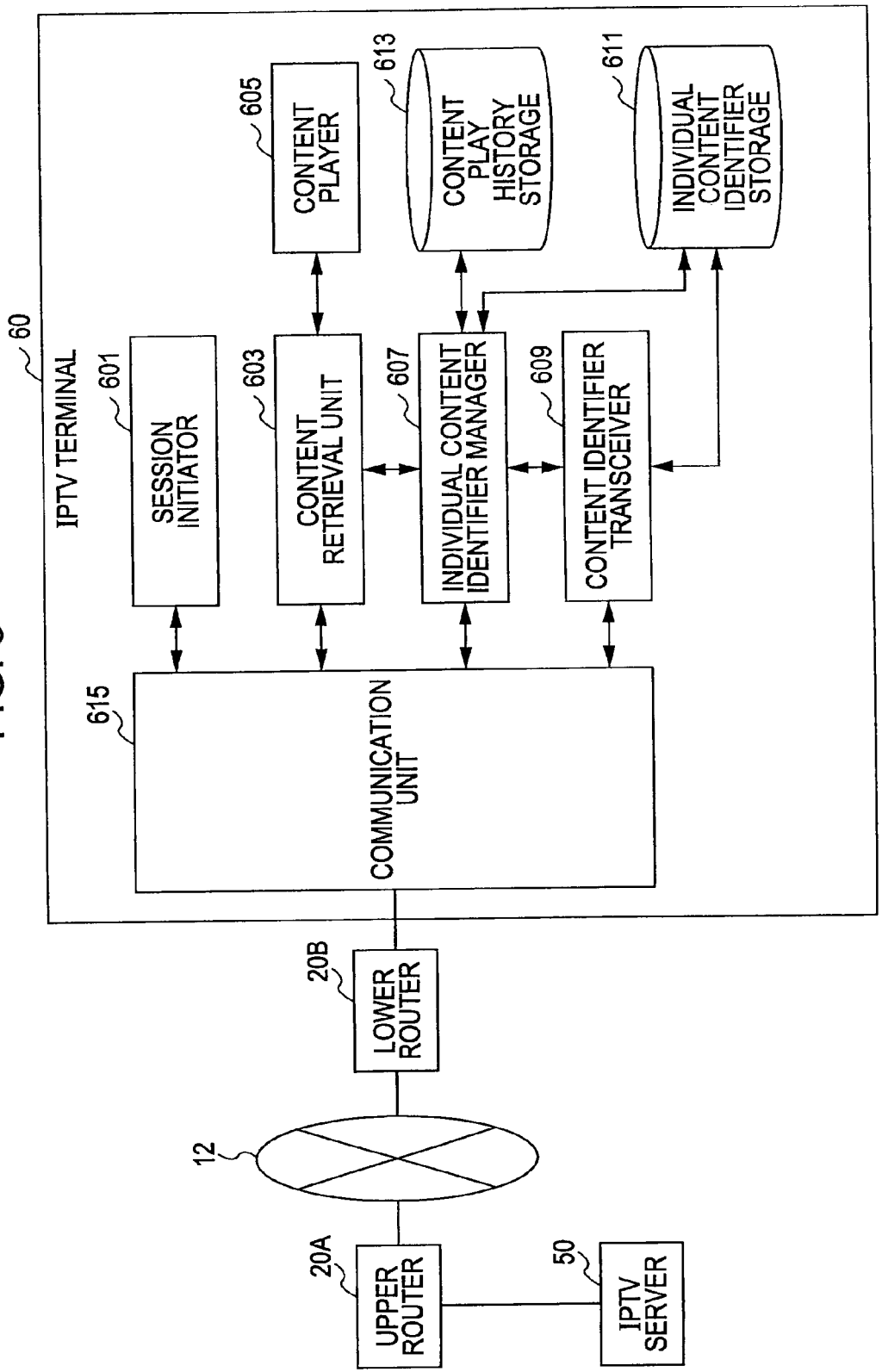
FIG. 8 is a block diagram illustrating a client device in accordance with the first embodiment of the present invention.

With reference to FIG. 8, the client terminal 60 as an IPTV terminal is described. The IPTV terminal 60 plays an important role in the multicasting system 10 of the first embodiment of the present invention. FIG. 8 illustrates the structure of the IPTV terminal 60 of the first embodiment of the present invention.

The IPTV terminal 60 of the first embodiment of the present invention includes, for example, a session initiator 601, a content retrieval unit 603, a content player 605, an individual content identifier manager 607, a content identifier transceiver 609, an individual content identifier storage 611, a content play history storage 613 and a communication unit 615.

The session initiator 601 creates a session with the delivery server 50 as an IPTV server, arranged external to the home network 14, via the lower router 20B, the core access network 12 and the upper router 20A. The creation/termination of the session is performed based on a predetermined protocol such as the session initiation protocol (SIP).

The content retrieval unit 603 issues a content delivery request to the IPTV server 50 based on the session initiated by the session initiator 601. To issue the content delivery request, the content retrieval unit 603 refers a content identifier of a desired content to the individual content identifier storage 611 via the individual content identifier manager 607 to be discussed later. Based on the multicast session description resulting from the reference, the content retrieval unit 603 requests the IPTV server 50 to deliver the content. When the IPTV server 50 delivers the content, the content retrieval unit 603 retrieves the content via the communication unit 615 and transfers the retrieved content to the content player 605. The content retrieval unit 603 may store the retrieved content onto a storage (not shown).

The content player 605 executes the multicast content transferred from the content retrieval unit 603 and outputs the multicast content to a display (not shown) arranged in the IPTV terminal 60. Upon executing the multicast content, the content player 605 requests the session initiator 601 to terminate the session.

The individual content identifier manager 607 responds to a content identifier retrieval request from the content retrieval unit 603 going to retrieve the multicast content. Based on the content identifier information stored on the individual content identifier storage 611, the individual content identifier manager 607 replies the multicast address corresponding to the content identifier to the content retrieval unit 603. As shown in FIG. 9, the content identifier information contains the content identifier of each content and the multicast session description mapped to each content. The multicast session description is described based on a predetermined protocol such as the session description protocol (SDP). As shown in FIG. 10, the multicast session description contains a session description of a multicast content (information identifying each session), time description (session effective times such as start and stop times of the session and the number of repetitions of the session) and media description (information related to the medium). The session description of the multicast content contains an address of the multicast content (multicast address), port number, QoS parameters such as request rate, codec information and delivery time. Codec identification information is a sort of metadata and a content retrieval path and the like can be known by referencing the content identification information based on the content identifier.

The individual content identifier manager 607 stores the content identifier requested by the content retrieval unit 603 onto the content play history storage 613 to be discussed later. More specifically, the individual content identifier manager 607 stores on the content play history storage 613 the play history of the multicast executed by the IPTV terminal 60. The individual content identifier manager 607 periodically analyzes the play history information stored on the content play history storage 613 and determines a multicast content highly likely to be accessed by the user of the IPTV terminal 60 (namely, a content highly likely to be played) and controls an update process to update the content identifier stored on the individual content identifier storage 611. The update process of the individual content identifier storage 611 is periodically performed. The content highly likely to be played on the IPTV terminal 60 is referred to a related content.

The analysis and update process of the individual content identifier storage 611 may be performed as processes distributed between the IPTV terminal 60 and the IPTV server 50. The IPTV server 50 may perform the update process (optimization process) only and the individual content identifier manager 607 in the IPTV terminal 60 may control the update process of the individual content identifier storage 611 only. The optimization process of the individual content identifier storage 611 is described below in detail.

The individual content identifier manager 607 collects the related content information concerning the related content and then updates the individual content identifier storage 611. With higher priority, the individual content identifier storage 611 thus stores the content identifier of the content highly likely to be executed by the IPTV terminal 60. The waiting time (overhead) to execution of the multicast content the user of the IPTV terminal 60 may wish to view is thus shortened.

In order to retrieve the content information of the related content analyzed and then selected by the individual content identifier manager 607, the content identifier transceiver 609 requests the IPTV server 50 to retrieve the content information and multicast session information mapped to the content identifier. Upon retrieving the content information of the related content, the content identifier transceiver 609 stores the content information of the related content onto the individual content identifier storage 611.

The individual content identifier storage 611 stores the content identifier of the related content highly likely to be executed by the IPTV terminal 60 from among the multicast contents provided by the IPTV server 50 as a content providing server. In this case, the individual content identifier storage 611 stores the content identifier with the multicast session information of the related content mapped thereto. As described above, the storage content of the individual content identifier storage 611 is periodically optimized and updated by the individual content identifier manager 607 and the content identifier transceiver 609.

The content play history storage 613 stores the content identifier of the multicast content executed so far by the IPTV terminal 60 as the play history information. For example, the play history information stored on the content play history storage 613 may be referenced by the individual content identifier manager 607 and then used to analyze execution history of the multicast contents by the IPTV terminal 60. The play history information may also be referenced by the optimizer 535 in the IPTV server 50 and used by the IPTV server 50 in the optimization process.

The communication unit 615 transmits to the IPTV server 50 via the core access network 12 a variety of pieces of information to be disclosed to the IPTV server 50 by each of the session initiator 601, the content retrieval unit 603, the content player 605, the individual content identifier manager 607 and the content identifier transceiver 609. The communication unit 615 also allows the IPTV terminal 60 to receive requests and the like from the IPTV server 50.

The IPTV server 50 as the delivery server and the IPTV terminal 60 as the client device of the first embodiment of the present invention have been discussed. Any widely available component or circuit may be employed to construct each of these units. A hardware structure dedicated to a function of a particular element may be used. The hardware structure may be appropriately modified depending on the technical level available when the embodiment is implemented. The above-referenced hardware structure has been discussed for exemplary purposes only and the present invention is not limited to such a hardware structure.

Figure 11:
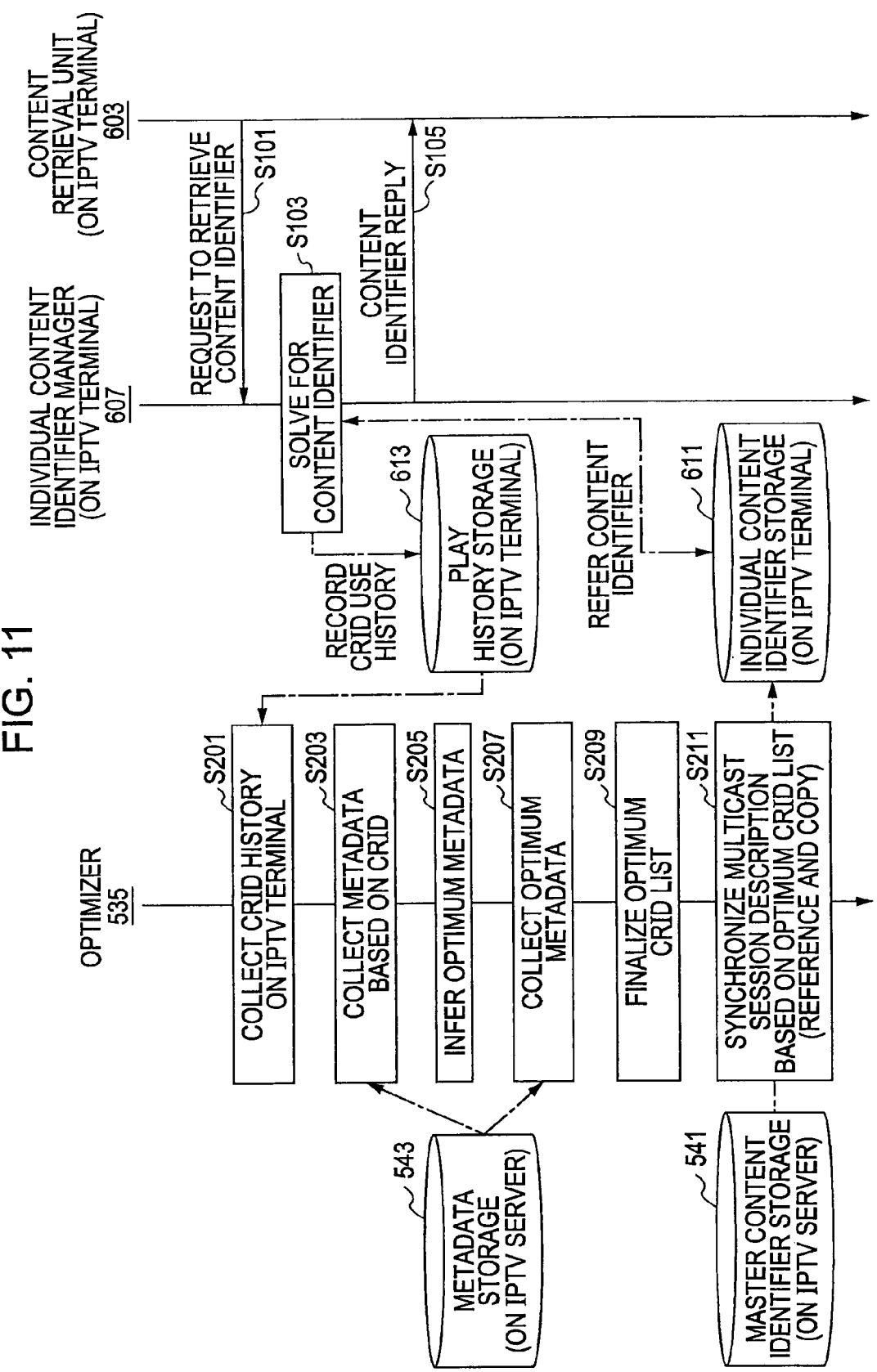
FIG. 11 illustrates an optimization process of an individual content identifier storage unit in accordance with the first embodiment of the present invention.

A specific example of the optimization process of the individual content identifier storage 611 in accordance with the first embodiment of the present invention is described in detail with reference to FIG. 11. FIG. 11 illustrates the optimization process of the individual content identifier storage 611.

The content retrieval unit 603 in the IPTV terminal 60 issues the content identifier retrieval request to the individual content identifier manager 607 (step S101). The individual content identifier manager 607 references the individual content identifier storage 611 and tries retrieving the content identifier (step S103). If the content identifier of the content requested by the content retrieval unit 603 is not stored on the individual content identifier storage 611, the individual content identifier manager 607 asks the IPTV server 50 about the content identifier of the content to retrieve the content (step S103). Upon completing the retrieval of the content identifier, the individual content identifier manager 607 stores the content identifier of the requested content on the content play history storage 613 (step S103). The individual content identifier manager 607 supplies the retrieved content identifier to the content retrieval unit 603 (step S105).

The optimizer 535 in the IPTV server 50 collects the play history information of the content identifier (CRID) from the content play history storage 613 in the IPTV terminal 60 (step S201). The optimizer 535 references the metadata storage 543 to collect metadata related to the content identifier recorded in the collected play history information (step S203). The related content selector 537 in the optimizer 535 infers and extracts genre and keyword of the multicast content appropriate for the IPTV terminal 60, based on the genre and keyword recorded in the collected metadata, related content identifier reference information and the like (step S205).

The related content selector 537 in the optimizer 535 collects the metadata of the multicast content containing the preferable genre and keyword extracted by referencing the metadata storage 543 (step S207). By referencing the content identifier (CRID) mapped to the collected metadata, the related content selector 537 retrieves a list of preferable content identifiers and the multicast session information containing content descriptions of these contents. The related content selector 537 finalizes the list of appropriate content identifiers by mapping the retrieved content identifiers to the multicast session information (step S209). The optimizer 535 references the master content identifier storage 541 in the IPTV server 50 in order to verify the finalized list of content identifiers. When the finalized list is verified, the updater 539 in the optimizer 535 updates the individual content identifier storage 611 in the IPTV terminal 60 (step S211).

The retrieval of the preferable content identifiers may be performed in a request-and-response method to the master content identifier storage 541 as described above. Alternatively, the content identifiers may be multicast to the IPTV terminals 60 so that desired content identifiers may be selected and retrieved on the IPTV terminals 60.

The optimization process of the individual content identifier storage 611 is all performed on the IPTV server 50. The above entire process or the inference and collection process of the preferable metadata may be performed by the individual content identifier manager 607 in the IPTV terminal 60.

The multicast book scheduling process of the first embodiment of the present invention is described below with reference to FIGS. 12-17. The structure of each of the upper router controller 30 and the lower router controller 40 is described first with reference to FIG. 12.

Figure 12:
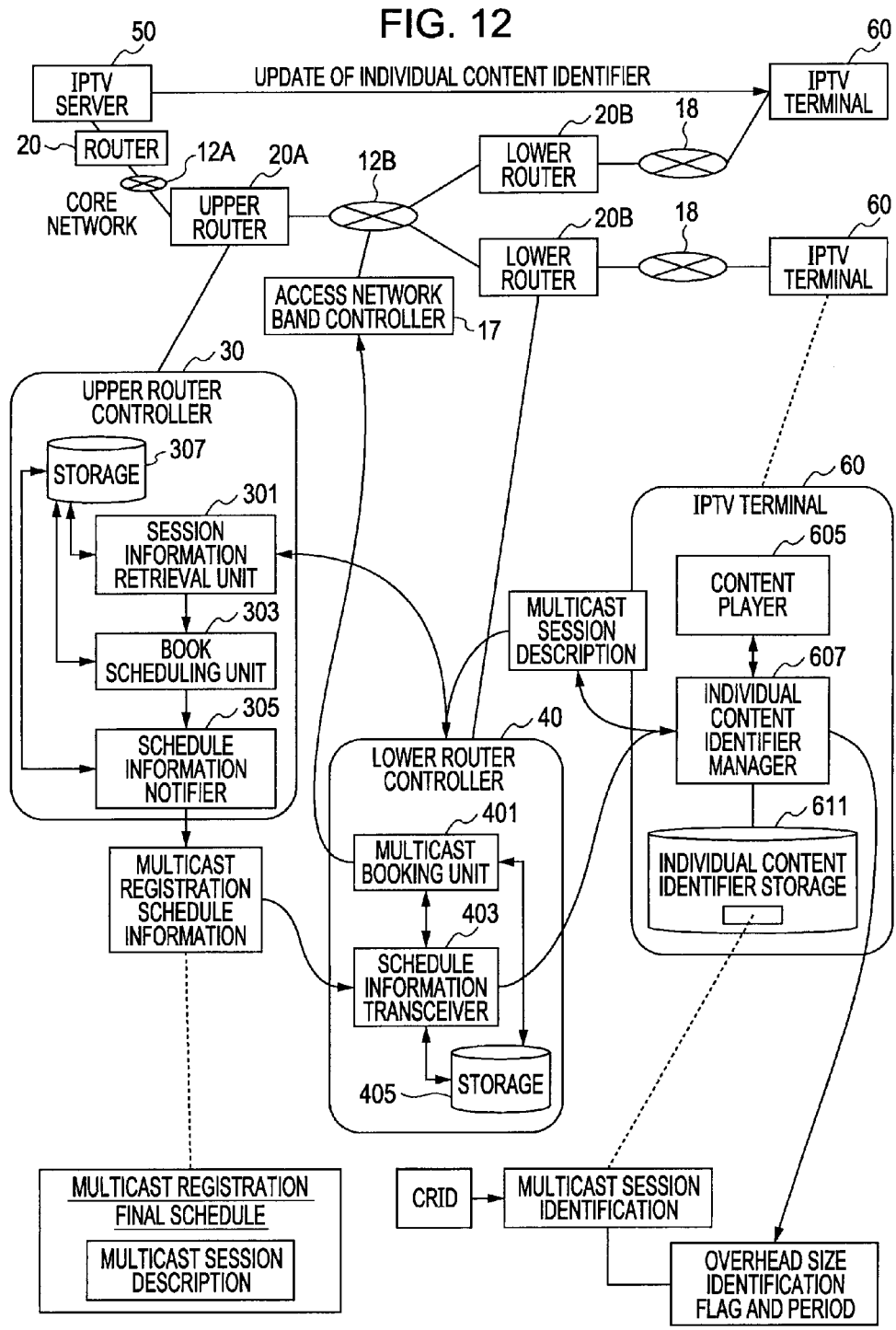
FIG. 12 illustrates a lower router controller and an upper router controller in accordance with the first embodiment of the present invention.

With reference to FIG. 12, the upper router controller 30 of the first embodiment includes a session information retrieval unit 301, a book scheduling unit 303, a schedule information notifier 305 and a storage 307.

The session information retrieval unit 301 retrieves from a plurality of client devices 60 the session information of the related content planned to be multicast within a book scheduling period, out of the session information of the related contents highly likely to be executed by the IPTV terminal 60 as the client device.

The book scheduling unit 303 determines the priority order of the multicast addresses within the book scheduling period based on the session information collected by the session information retrieval unit 301. The book scheduling unit 303 schedules the multicast addresses in which each lower router 20B can participate within the book scheduling period, based on the determined priority order and permitted workload of an access network connecting the upper router 20A controlled by the upper router controller 30 to the lower router 20B.

The schedule information notifier 305 notifies via the upper router 20A the lower router controller 40, controlling the lower routers 20B connected downstream of the upper router 20A, of book scheduling information representing scheduling results.

The storage 307 stores a variety of parameters generated when the upper router controller 30 controls the upper router 20A and the generated book scheduling information. Each element in the upper router controller 30 can freely write and read data onto the storage 307.

Operation of each of the session information retrieval unit 301, the book scheduling unit 303 and the schedule information notifier 305 is described in detail below.

As shown in FIG. 12, the lower router controller 40 of the first embodiment of the present invention includes a multicast booking unit 401, a schedule information transceiver 403 and a storage 405, for example.

The multicast booking unit 401 performs the participation/disengagement process of each lower router 20B to each multicast address within the book scheduling period based on the multicast book scheduling information transmitted from the upper router controller 30.

The schedule information transceiver 403 receives the multicast book scheduling information from the upper router controller 30 while transmitting the received multicast book scheduling information to the IPTV terminal 60 connected to the lower router 20B controlled by the lower router controller 40.

The storage 405 stores a variety parameters generated when the lower router controller 40 controls the lower router 20B and received book scheduling information. Each element in the lower router controller 40 can freely write and read data onto the storage 405.

Operation of each of the multicast booking unit 401 and the schedule information transceiver 403 is described in detail.

The functions of the upper router controller 30 and the lower router controller 40 in accordance with the first embodiment of the present invention have been discussed. Any widely available component or circuit may be employed to construct each of these units. A hardware structure dedicated to a function of a particular element may be used. All functions may be performed by a CPU. The hardware structure may be appropriately modified depending on the technical level available when the embodiment is implemented.

The multicast book scheduling process of the first embodiment of the present invention is described in detail below.

In the discussion that follows, the lower router 20B as a multicast router is arranged on the border between the home network 14 and an access network 12B and the IPTV terminal 60 as a multicast client device is connected to the home network 14 as illustrated in FIG. 12. The access network 12B connects to an access network band controller 17 that manages a band as a network resource in the access network. An upper router 20A is arranged between the access network 12B and a core network 12A. An IPTV server 50 as a delivery server is connected to the core network 12A via a multicast router 20. The upper router 20A connects to an upper router controller 30 and the lower router 20B connects to a lower router controller 40.

The block diagram of the IPTV terminal 60 of FIG. 12 shows only parts of the IPTV terminal 60. FIG. 8 illustrates all the elements of the IPTV terminal 60.

As shown in FIG. 12, the multicast book scheduling process of the first embodiment of the present invention is generally performed as described below. The individual content identifier manager 607 in the IPTV terminal 60 retrieves the multicast session description from the individual content identifier storage 611 in accordance with the content identifier. The session information retrieval unit 301 in the upper router controller 30 retrieves the multicast session description from the IPTV terminal 60 via the lower router controller 40 and the book scheduling unit 303 in the upper router controller 30 generates the book scheduling information. The schedule information notifier 305 in the upper router controller 30 transfers the generated book scheduling information to the lower router controller 40.

The schedule information transceiver 403 in the lower router controller 40 receives the book scheduling information transferred from the upper router controller 30. Based on the book scheduling information, the multicast booking unit 401 performs the participation process of the multicast addresses to the access network band controller 17. The participation process results are then transferred to the IPTV terminal 60 via the schedule information transceiver 403.

In response to the participation process results, the individual content identifier manager 607 in the IPTV terminal 60 adds identification information relating to a size of overhead (length of the waiting time of channel switching) and information relating to period to the multicast session description stored on the individual content identifier storage 611. The individual content identifier manager 607 thus updates the individual content identifier storage 611.

Figure 13:
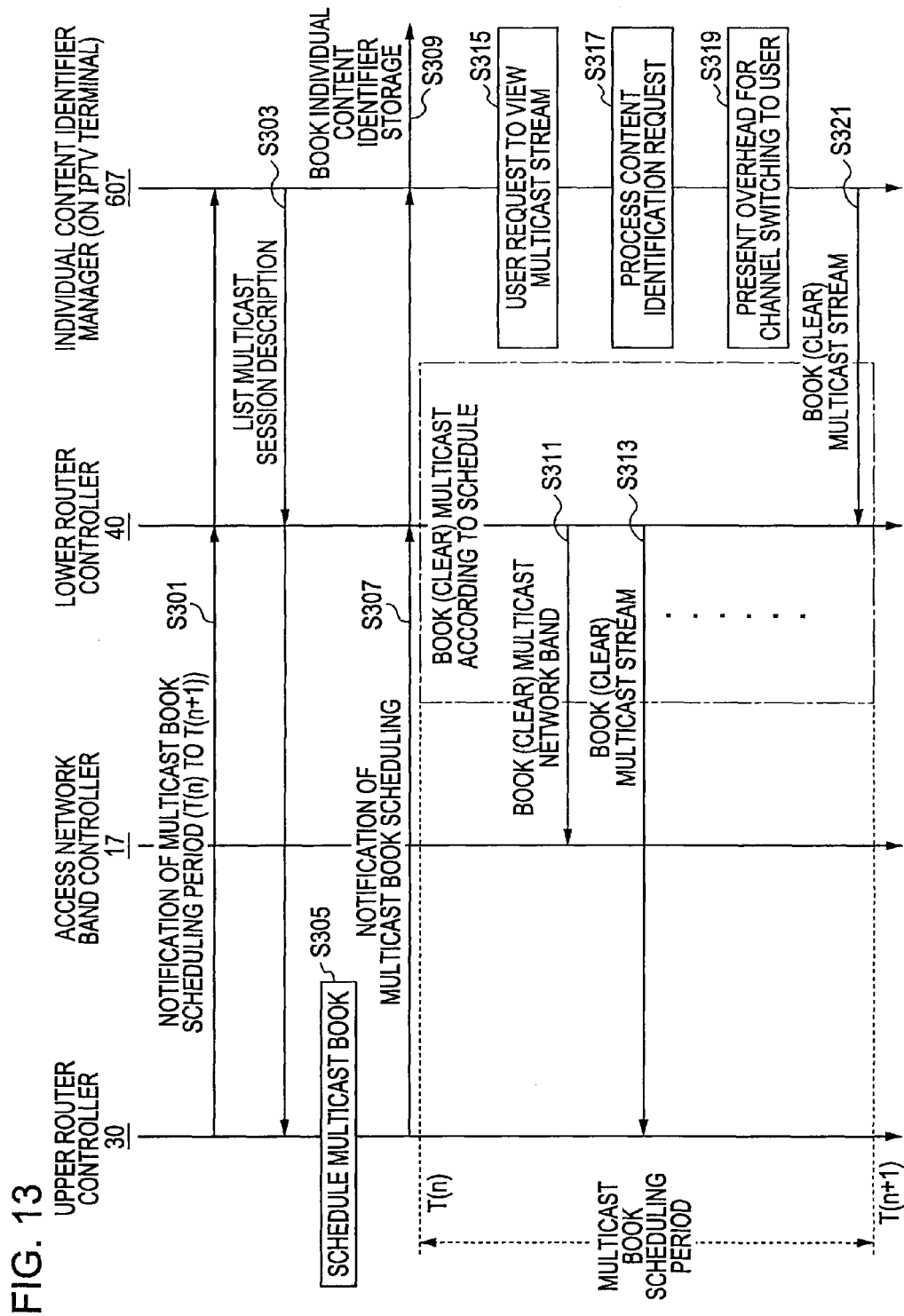
FIG. 13 illustrates a multicast book scheduling process in accordance with the first embodiment of the present invention.

The multicast book scheduling process is described in detail below with reference to FIG. 13.

The session information retrieval unit 301 is contained in the upper router controller 30 controlling the upper router 20A arranged on the border between the core network 12A and the access network 12B. The session information retrieval unit 301 designates time T(n) and time T(n+1) as a multicast book scheduling period (T(n)<T(n+1)) and notifies the individual content identifier manager 607 in the IPTV terminal 60 of the multicast book scheduling period via the lower router controller 40 (step S301). The individual content identifier manager 607 in the IPTV terminal 60 references the individual content identifier storage 611 and retrieves a list of multicast session descriptions corresponding to the received scheduling period (T(n)-T(n+1)) (multicasts planned within the period). The individual content identifier manager 607 notifies the session information retrieval unit 301 in the upper router controller 30 of the list via the lower router controller 40 controlling the lower router 20B closest to and connected to the IPTV terminal 60 (step S303).

The book scheduling unit 303 in the upper router controller 30 distributes and adjusts the band so that the access network 12B is not overloaded. The distribution and adjustment of the band are performed based on the QoP parameters described in the multicast session description of which a plurality of lower router controllers 40 have notified. The book scheduling unit 303 schedules participation/disengagement of the multicast booking unit 401 arranged downstream of the upper router 20A to the multicast group (step S305). The book scheduling unit 303 notifies the lower router controller 40 of multicast book scheduling information (step S307).

The lower router controller 40 notifies the individual content identifier manager 607 in the IPTV terminal 60 of the multicast book scheduling information transferred from the upper router controller 30 (step S307). In response to the multicast book scheduling information, the individual content identifier manager 607 adds a size identification flag of the multicast overhead and period to the content identifier information stored on the individual content identifier storage 611 (step S309).

The multicast booking unit 401 in the lower router controller 40 performs a book/clear process of the multicast network band to the access network band controller 17 based on the multicast book scheduling information transferred from the upper router controller 30 (step S311). The multicast booking unit 401 performs the participation/disengagement process to the multicast group to the upper router controller 30 (step S313).

When a multicast viewing request is generated in the IPTV terminal 60 (step S315), the content retrieval unit 603 in the IPTV terminal 60 issues a content identifier retrieval request to the individual content identifier manager 607. The individual content identifier manager 607 performs a content identifier request process responsive to the retrieval request (step S317). The individual content identifier manager 607 replies a multicast address (step S319). In this case, the individual content identifier manager 607 also replies indication as to whether channel switching overhead is present taking into consideration the overhead size identification flag and period. The IPTV terminal 60 performs multicast booking to the lower router controller 40 (step S321). The lower router controller 40 initiates a session between the IPTV server 50 and the IPTV terminal 60 using a reserved band. Content delivery is thus started.

In parallel with the above-described process, the session information retrieval unit 301 in the upper router controller 30 determines a new period of from T(n+2) (T(n+1)<T(n+2)) and repeats the above-referenced process so that the new scheduling is in time before start time, namely, T(n+1).

A selection process of the session description list within the multicast book scheduling period performed by the individual content identifier manager 607 is described below with reference to FIG. 14.

Figure 14:
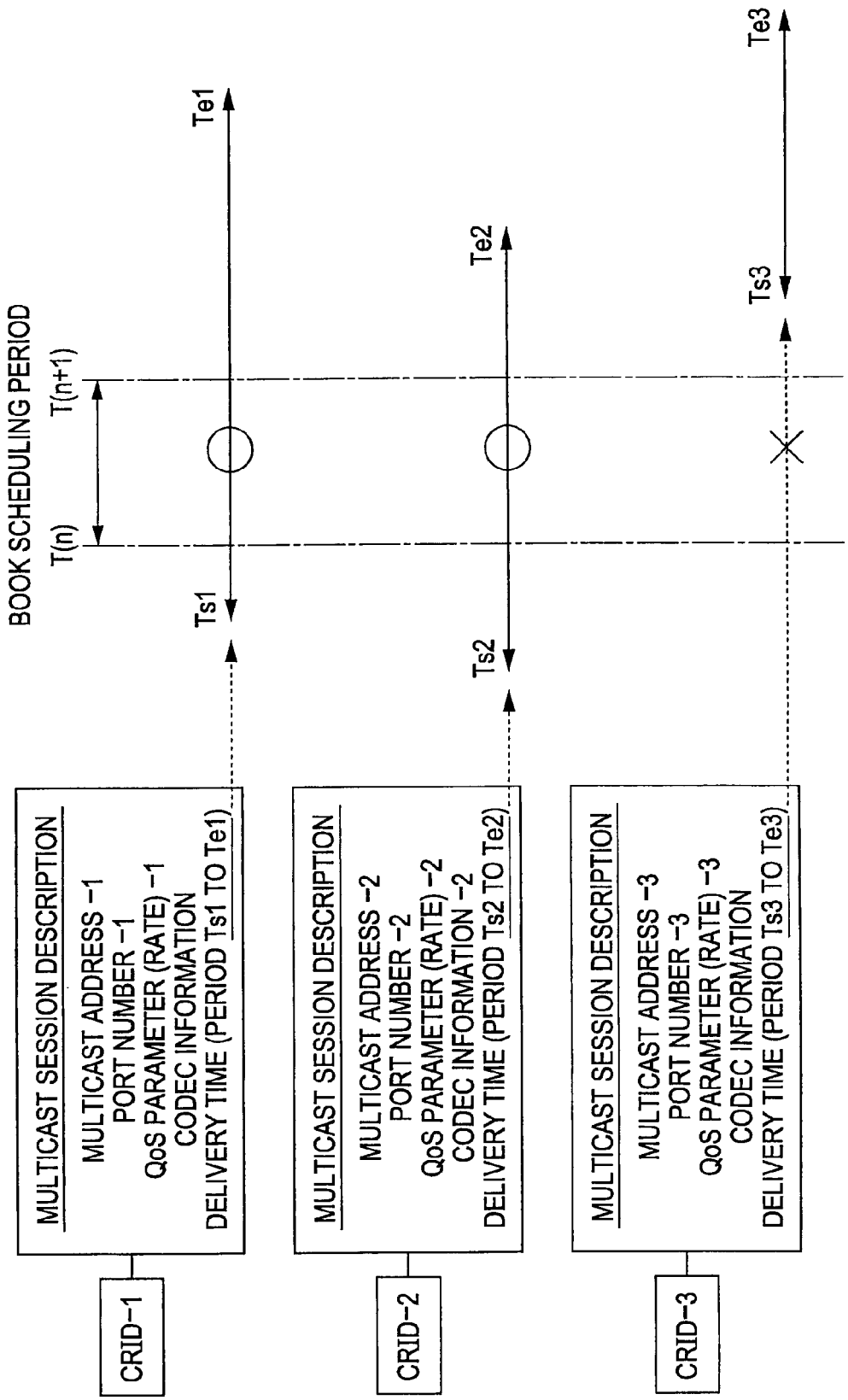
FIG. 14 illustrates the multicast booking scheduling process in accordance with the first embodiment of the present invention.

The individual content identifier storage 611 in the IPTV terminal 60 now stores three content identifiers (CRID) of FIG. 14. These content identifiers are mapped to the corresponding the multicast session descriptions. The multicast session description contains a multicast address, a port number, a QoS parameter, codec information and delivery time.

For example, CRID-1 has delivery time of Ts1-Te1, CRID-2 has delivery time of Ts2-Te2, and CRID-3 has delivery time of Ts3-Te3. Start times and end times of the periods are shown in FIG. 14.

The session information retrieval unit 301 in the upper router controller 30 notifies the individual content identifier manager 607 in the IPTV terminal 60 of the book scheduling period T(n)-T(n+1). The individual content identifier manager 607 in the IPTV terminal 60 references the delivery times of CRID-1 through CRID-3 as the content identifiers stored on the individual content identifier storage 611.

As shown in FIG. 14, contents CRID-1 and CRID-2 have the book scheduling period T(n)-T(n+1) within the delivery time, and the delivery of the content CRID-3 does not start within the book scheduling period T(n)-T(n+1). The individual content identifier manager 607 in the IPTV terminal 60 discloses CRID-1 and CRID-2 to the session information retrieval unit 301 in the upper router controller 30.

The participation/disengagement process to the multicast address in accordance with the first embodiment of the present invention is specifically described with reference to FIGS. 15 and 16.

The session information retrieval unit 301 in the upper router controller 30 collects the session information from the IPTV terminal 60 via the lower router controller 40 (step S401). In accordance with the session information, the book scheduling unit 303 in the upper router controller 30 sorts the session description of the multicast content planned within the notified period T(n)-T(n+1) according to the multicast address (step S403). The book scheduling unit 303 weights and classifies the multicast addresses in the order of frequency of occurrence (step S407).

As shown in FIG. 16, the session information retrieval unit 301 retrieves from the IPTV terminal 60 a multicast address A, a multicast address B and a multicast address C. The book scheduling unit 303 sorts collected session information according to the multicast address. FIG. 16 shows the sorting results. The book scheduling unit 303 weights the multicast addresses within the notified period with frequency of occurrence and classifies the multicast addresses. In this case, the multicast address B having the largest weight within the notified period has the highest priority, followed by the multicast address A and then the multicast address C.

The book scheduling unit 303 in the upper router controller 30 starts with the highest class, acquiring a requested rate (requested band) r in the multicast session description corresponding to the multicast address. The requested rate in each multicast session is described as r(class(j)) where j=1, 2, 3 (a smaller j represents a higher priority).

The book scheduling unit 303 sums r(class(j)) with j successively increasing from j=1 and finalizes a maximum value J not exceeding a maximum band R permitted to be used within the access network 12B (step S407). For example, if r(1)+r(2)<R and r(1)+r(2)+r(3)>R, a maximum value of j not exceeding the maximum band R is 2. The book scheduling unit 303 thus determines the maximum value J of priority to be 2.

Figure 15A:
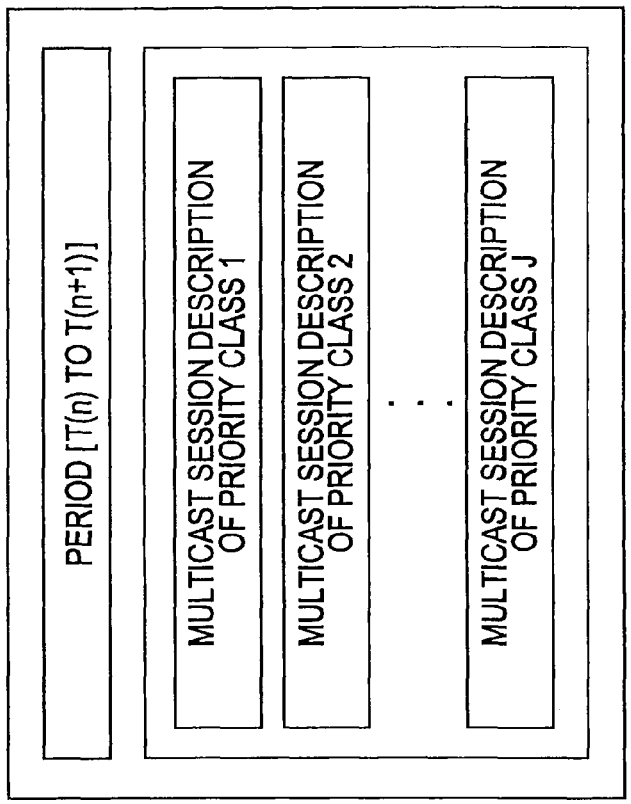
FIGS. 15A and 15B illustrate the multicast booking scheduling process in accordance with the first embodiment of the present invention.
Figure 15B:
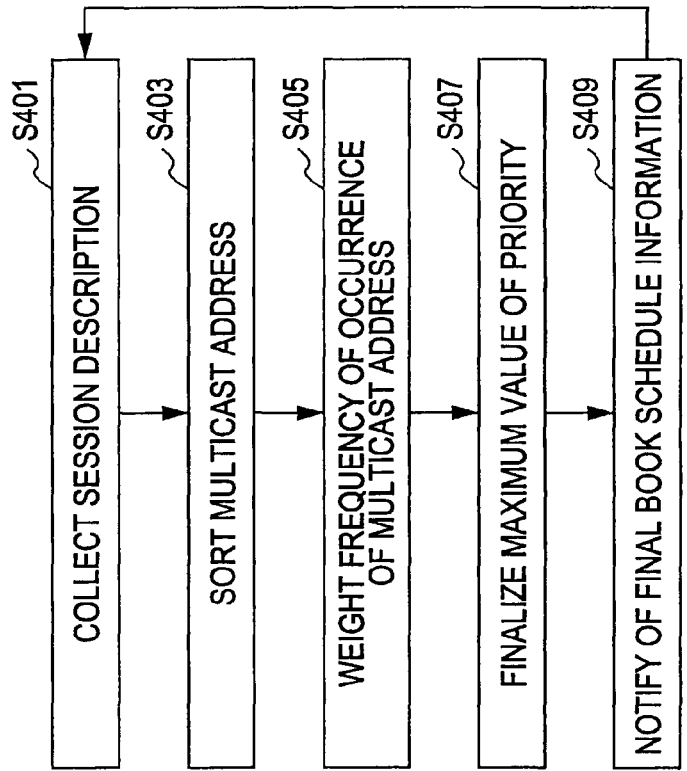

As shown in FIG. 15, the book scheduling unit 303 starts selecting the multicast addresses with the one having the highest priority in accordance with the maximum value of the finalized priorities, thus generating final book scheduling information. The schedule information notifier 305 notifies the lower router controller 40 of the final book scheduling information (step S409). The final book scheduling information contains a list of session descriptions containing a description of multicast addresses corresponding to the period T(n)-T(n+1) and class j=i–N. The schedule information notifier 305 also notifies the individual content identifier manager 607 in the IPTV terminal 60 of the final book scheduling information (step S409).

The upper router controller 30 thus notifies the lower router controller 40 of the final book scheduling information and the lower router controller 40 performs the above-referenced process to book the multicast content.

The multicast content is booked as described above and the IPTV terminal 60 is notified of the multicast book scheduling information. Based on the multicast book scheduling information, the individual content identifier manager 607 adds to the content identifier information stored on the individual content identifier storage 611 the size identification flag and period of the multicast overhead. The content identifier information stored on the individual content identifier storage 611 is described below with reference to FIG. 17.

The lower router controller 40 performs the participation process to the multicast content in accordance with the multicast book scheduling information optimized by the upper router controller 30. Depending on whether the participation process has been completed, i.e., according to the delivery time, the multicast addresses mapped to the content identifiers stored on the individual content identifier storage 611 in the IPTV terminal 60 may or may not have undergone the participation process.

The multicast address with which the multicast participation process is performed within the book period T(n)-T(n+1) has a smaller overhead in channel switching. The individual content identifier manager 607 in the IPTV terminal 60 may now perform the participation process with the multicast address within a given book period. Within that book period, the individual content identifier manager 607 records the value of the size identification flag of channel switching overhead as a small value indicating that the channel switching overhead is small.

Figure 17:
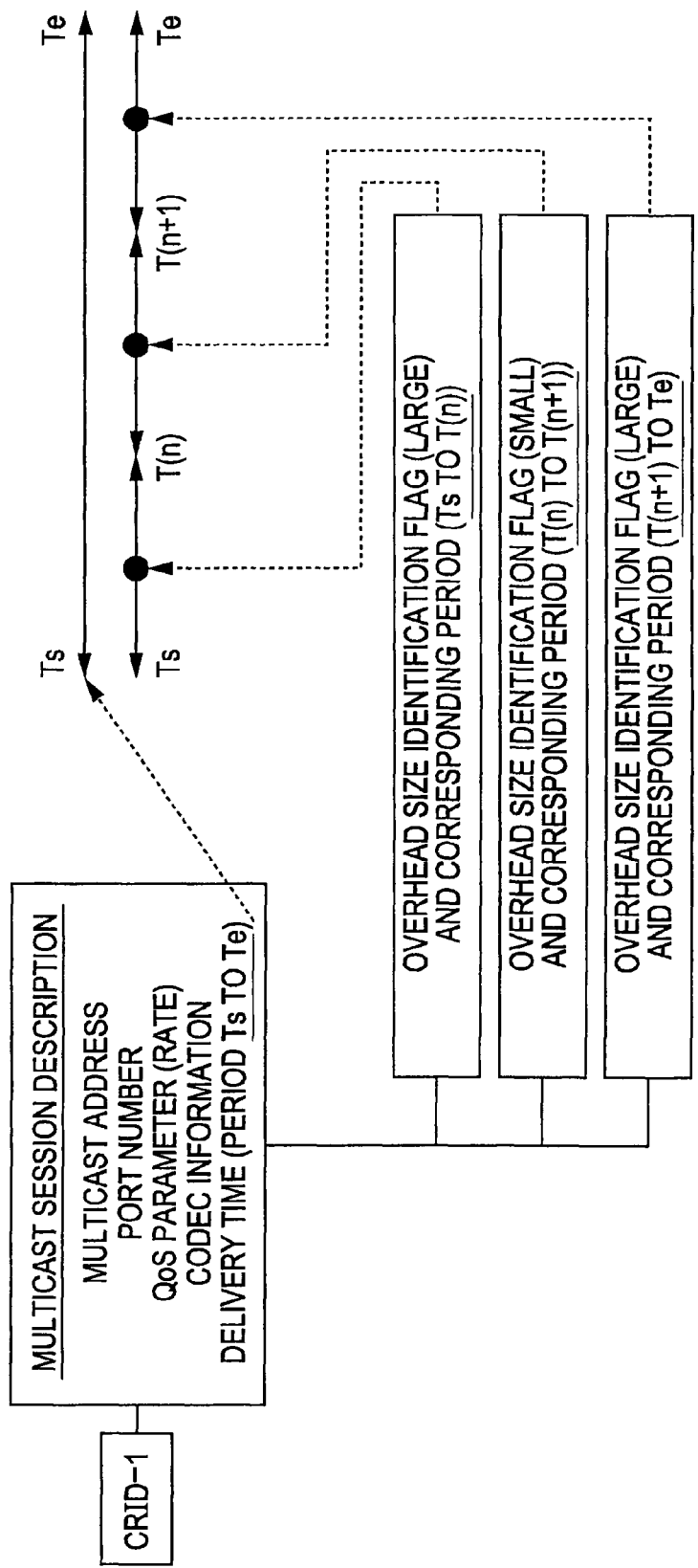
FIG. 17 illustrates the multicast booking scheduling process in accordance with the first embodiment of the present invention.

The multicast session description mapped to the content identifier CRID-1 illustrated in FIG. 17 is described below. At the multicast address mapped to that content identifier, delivery starts at time Ts and ends at time Te. The upper router controller 30 notifies of the multicast book scheduling information of the multicast address indicating that no participation process is performed until Ts-T(n), that a participation process to the multicast content is performed within the period T(n)-T(n+1), and that no participation process to the multicast content is performed within the period T(n+1)-T(e).

Upon receiving the notification, the individual content identifier manager 607 sets the value of the overhead size identification flag to be large within the period of Ts-T(n), sets the value of the overhead size identification flag to be small within the period of T(n)-T(n+1), and the value of the overhead size identification flag to be large within the period of T(n+1)-Te.

In the above discussion, the optimization process of the individual content identifier storage 611 and the optimization process of the multicast book scheduling have been discussed. These optimization processes may be performed in parallel and independent of each other. The optimization of the multicast book scheduling is performed based on the information from the optimized individual content identifier storage.

The information of the individual content identifier storage 611 stored by the IPTV terminal 60 is optimized based on the play history information of the IPTV terminal 60. The multicast addresses book requested based on the optimized content identifiers are classified according to frequency of request. The book scheduling is optimized, and the channel switching waiting time is efficiently shortened. The band available over the entire network is effectively used.

Second Embodiment

A second embodiment of the present invention is described in detail below with reference to FIGS. 18 through 27A-27C. In accordance with the second embodiment of the present invention, the IPTV server 50 functions as a delivery server and the IPTV terminal 60 functions as a client device.

In typical channel switching, a channel currently displayed on a main screen (entire screen) is switched to a next channel on the main screen in response to a selection of a channel switching button (command). The channel switching overhead to the next channel cannot be predicted and an impatiently long waiting time can result.

As described with reference to the first embodiment of the present invention, the channel switching overhead can be reduced by participating beforehand in the multicast group having a constantly high hit ratio. A more comfortable zapping operation may be performed by accounting for the size of the overhead during the selection of a target session in the zapping operation.

In connection with the second embodiment of the present invention, the following methods are described below. In a network band management method, the network band assigned to the multicast sessions in the access network is divided into two classes. A first class is assigned with a master cast session highly likely to be view registered in the access network from among the master multicast sessions registered on an upper core network higher than the access network, and a second class is assigned with an extremely low rate multicast session into which the master multicast session registered on the core network has been converted. In a prediction and comparison method of the channel switching overhead, the multicast sessions corresponding to the second class are displayed on multi-windows and an arrangement order of the channels on the multi-windows is selected according to a plurality of optimization rules (priority criteria) or windows are displayed in a manner such that a resource management state in the access network is recognized.

With these methods, the multichannel zapping operation is efficiently controlled on the multicast client device such as an IPTV terminal.

Figure 18:
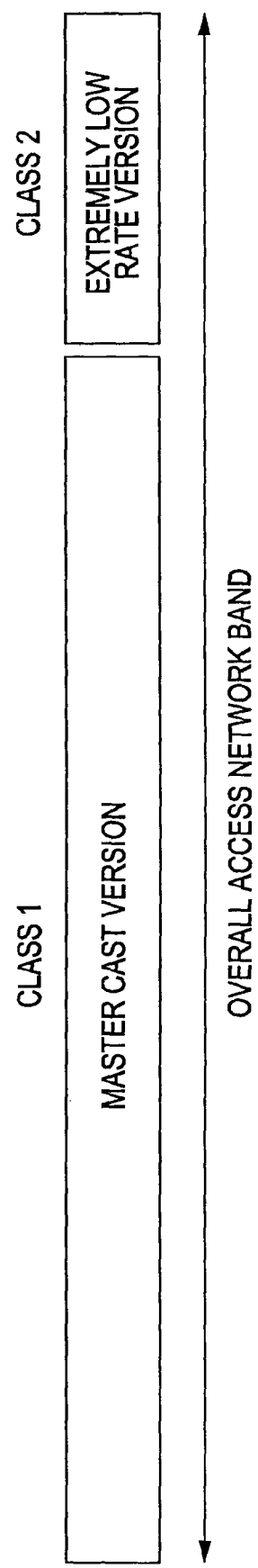
FIG. 18 illustrates a access network band in accordance with a second embodiment of the present invention.

The multicasting system 10 of the second embodiment of the present invention divides the network band of the access network 12B (the entire band available to be used for multicast streaming) into a plurality classes, and the divided classes are assigned with respective usages. For example, as shown in FIG. 18, two classes, namely, class 1 and class 2 are defined. The class 1 is assigned with the network band for the master version multicast stream and the class 2 is assigned with the network band for the extremely low rate version multicast stream. The number of defined classes is not limited to two, and any number of classes may be defined.

The multicasting system 10 of the second embodiment of the present invention is identical in structure to the multicasting system 10 of the first embodiment discussed with reference to FIG. 1. More specifically, the lower router 20B is arranged on the border between the home network 14 and the access network 12B and the IPTV terminal 60 as a multicast client device is arranged over the home network segment. The upper router 20A as a multicast router is arranged on the border between the access network 12B and the IPTV server 50 as a delivery server.

The upper router 20A is controlled by the upper router controller 30 connected thereto and the lower router 20B is controlled by the lower router controller 40 connected thereto.

The upper router controller 30, the lower router controller 40 and the access network band controller 17 connected to the lower router 20B cooperate with each other, thereby performing registration management of the network band of the access network 12B and the multicast book scheduling process.

The IPTV server 50 and the lower router controller 40 in the second embodiment are respectively substantially identical in structure and advantage to the counterparts in the first embodiment and the detailed discussion thereof is omitted herein.

The IPTV terminal 60 as a client device of the second embodiment of the present invention is described in detail below with reference to FIG. 19.

Figure 19:
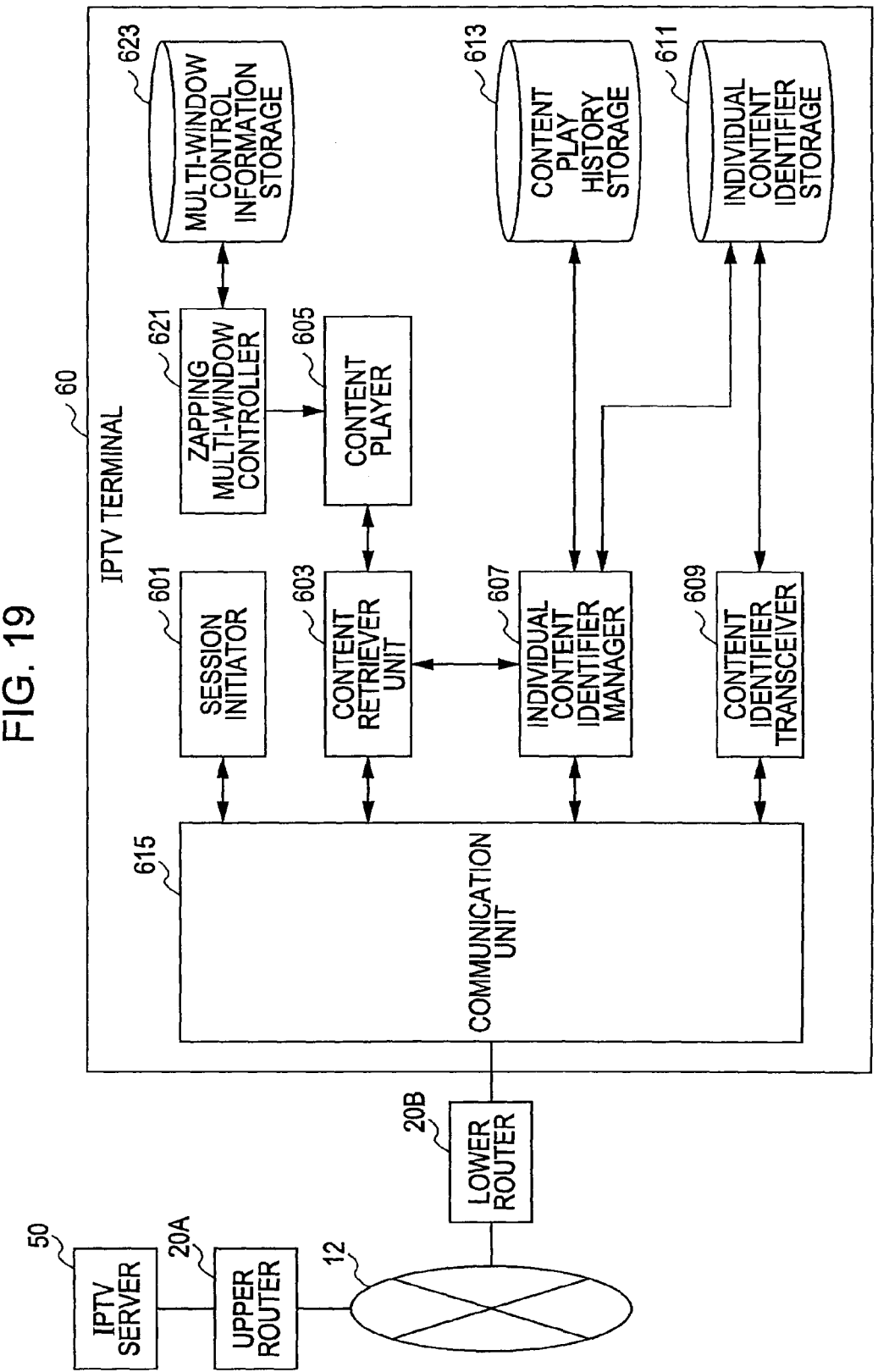
FIG. 19 is a block diagram illustrating a client device in accordance with the second embodiment of the present invention.

As shown in FIG. 19, the IPTV terminal 60 of the second embodiment of the present invention includes a session initiator 601, a content retrieval unit 603, a content player 605, an individual content identifier manager 607, a content identifier transceiver 609, an individual content identifier storage 611, a content play history storage 613, a communication unit 615, a zapping multi-window controller 621 and a multi-window control information storage 623.

The session initiator 601, the content retrieval unit 603, the content player 605, the content identifier transceiver 609, the individual content identifier storage 611, the content play history storage 613 and the communication unit 615 are substantially identical in structure and advantage to the counterparts thereof in the IPTV terminal 60 of the first embodiment, and the discussion thereof is omitted herein.

The individual content identifier manager 607 has a function of a switching time addition unit in addition to the function of the individual content identifier manager 607 in the first embodiment of the present invention. Based on the book scheduling information provided from the upper router controller 30, the switching time addition unit adds information relating to the channel switch time of each content within the book scheduling period to the session information of the content stored on the individual content identifier storage 611.

The zapping multi-window controller 621 generally controls the function of a multi-window displaying a list of selectable multicast channels to be used by the user of the IPTV terminal 60 for zapping. The multi-window used for zapping is displayed on the output unit of the IPTV terminal 60, for example.

The multi-window control information storage 623 stores multi-window control information containing display control rule of the multi-window for display control of the multi-window.

The functions of the zapping multi-window controller 621 and the multi-window control information storage 623 are described in detail below.

The master version multicast stream in the multicasting system 10 of the second embodiment of the present invention is multicast book scheduled in the same manner as described in connection with the first embodiment discussed with reference to FIGS. 11-17. The multicast stream is then delivered to the IPTV terminal 60. The band of the extremely low rate version multicast stream illustrated as the class 2 in FIG. 18 is managed as described below.

Figure 20:
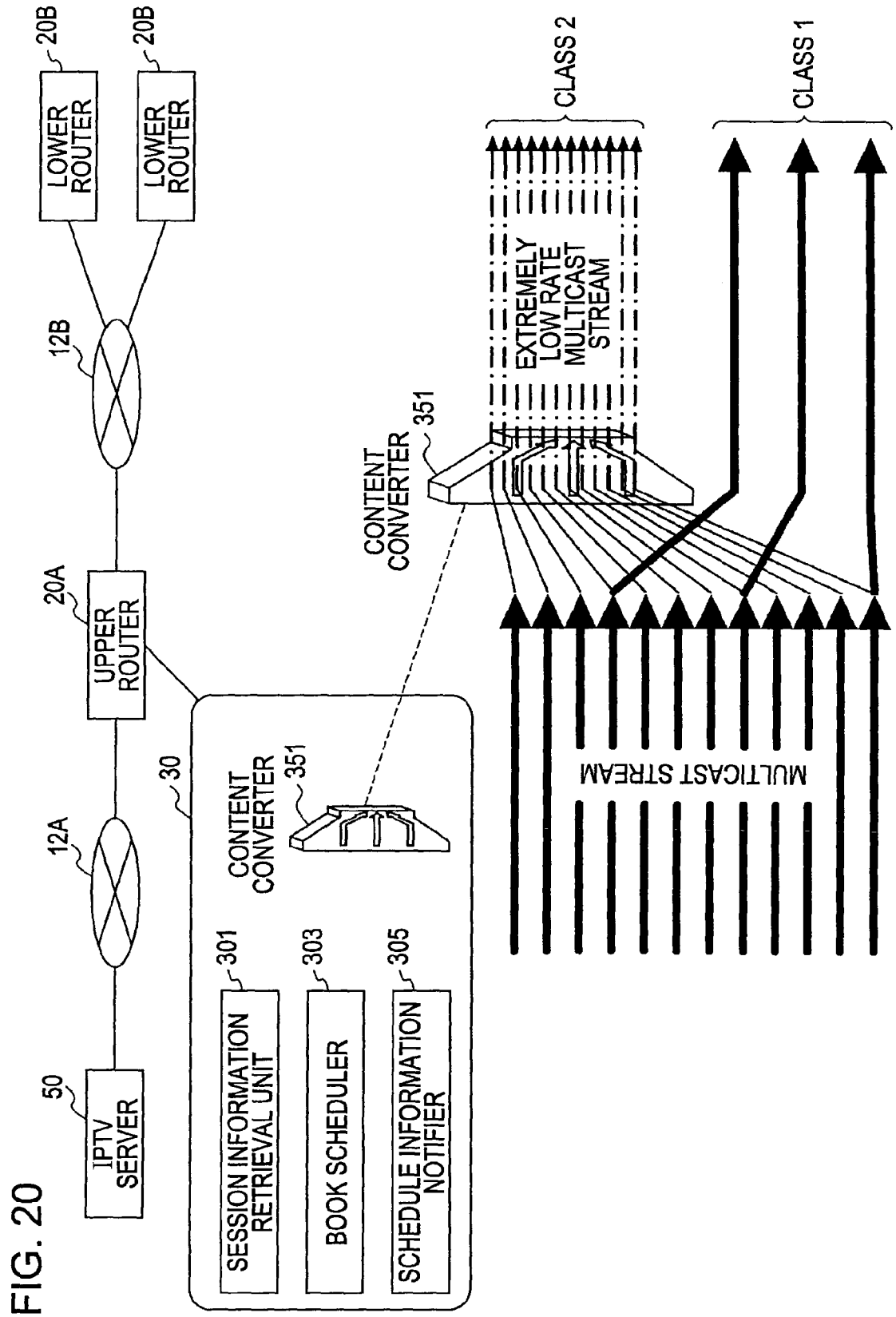
FIG. 20 illustrates a upper router controller in accordance with the second embodiment of the present invention.

In order to deliver the extremely low rate version multicast stream in the multicasting system 10 of the second embodiment, the upper router controller 30 includes a content converter 351 of FIG. 20 in addition to the elements of the upper router controller 30 of FIG. 12. The content converter 351 participates in the band management of the access network 12B in cooperation with an access network controller (not shown) connected to the access network 12B.

As shown in FIG. 20, the content converter 351 generates the extremely low rate version multicast stream from the multicast stream participating in the multicast group over the core network 12A above the access network 12B. The overall band of the generated extremely low rate version multicast stream is controlled to within a band pre-assigned to the class 2.

Figure 21:
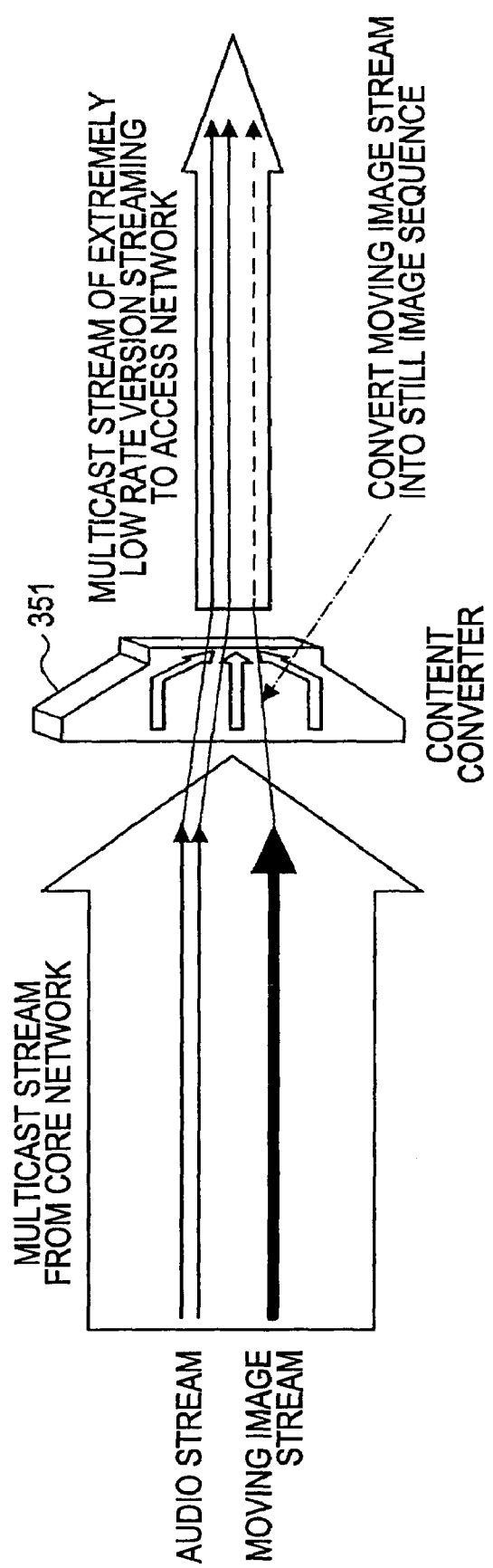
FIG. 21 illustrates a content converter in accordance with the second embodiment of the present invention.

As shown in FIG. 21, an audio portion of the extremely low rate version multicast stream remains unchanged. A moving image portion of the multicast stream is converted (degraded) into a periodical snapshot sequence and the snapshot sequence is then synchronized with the audio portion of the multicast stream. A new multicast stream is thus generated. The generated extremely low rate version multicast stream is all output to the access network 12B. The core network 12A has a capacity larger than the access network 12B. Multicast streams substantially larger in number than the multicast streams registered in the access network 12B are registered in the core network 12A. The number of extremely low rate version multicast streams becomes larger than the number of master version multicast streams.

Figure 22:
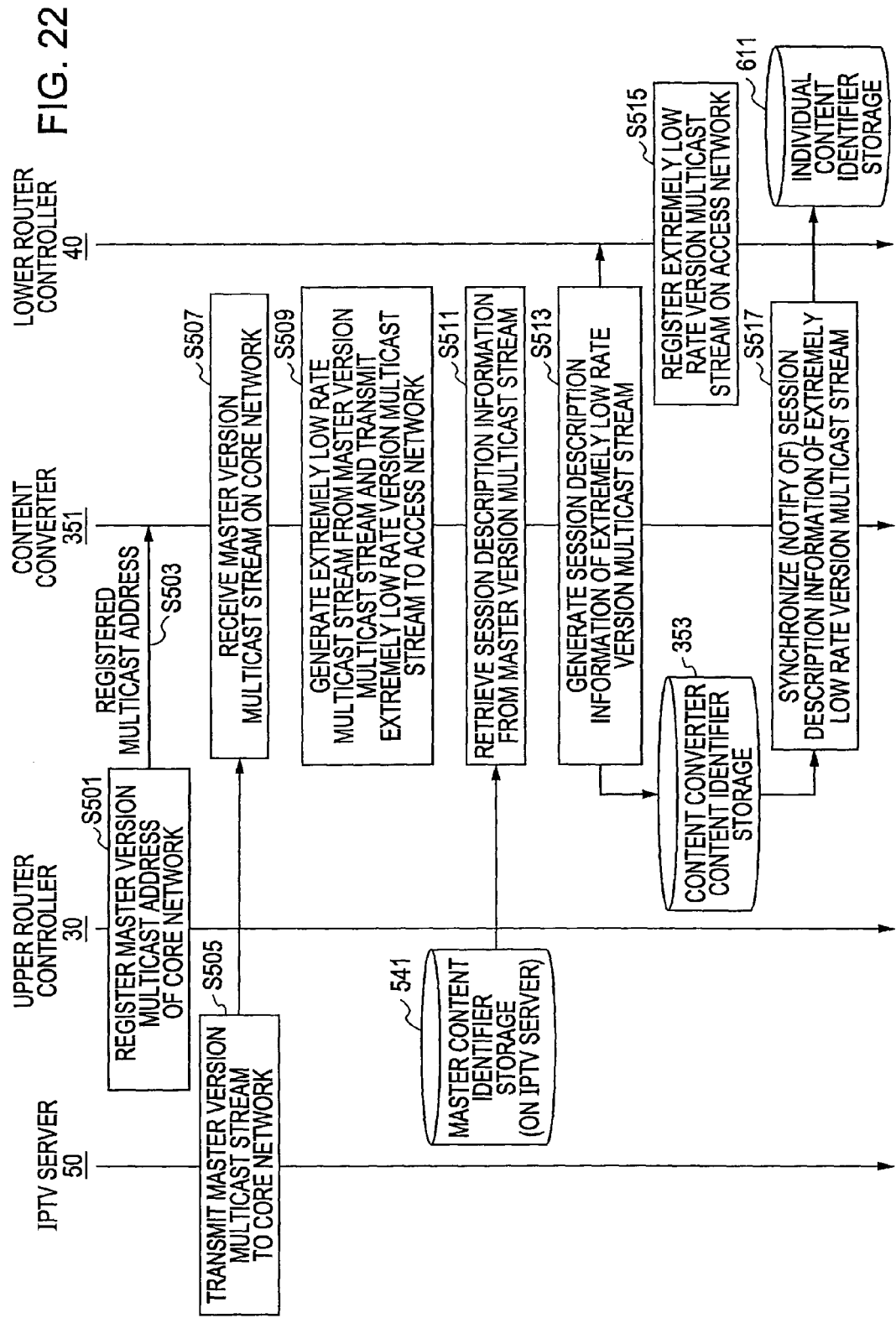
FIG. 22 illustrates the content converter in accordance with the second embodiment of the present invention.

The generation and output flow of the extremely low rate version multicast stream are described in detail with reference to FIG. 22.

The upper router controller 30 connected to the upper router 20A registers the master version multicast stream delivered from the IPTV server 50 via the core network 12A (step S501). The upper router controller 30 transfers the registered multicast address to the content converter 351 in the upper router controller 30 (step S503). A session is initiated from the IPTV server 50 to the upper router controller 30, and the master version multicast stream is thus transferred from the IPTV server 50 to the upper router controller 30. Concurrently, the master version multicast stream reaches the content converter 351 in the upper router controller 30 (step S505).

The content converter 351 receives the master version multicast stream over the core network 12A (step S507). The content converter 351 converts the video portion of the stream while leaving unchanged the audio portion of the stream. The content converter 351 thus generates the extremely low rate version multicast stream from the master version multicast stream and then transfers the extremely low rate version multicast stream to the access network 12B (step S509).

From the master content identifier storage 541 in the IPTV server 50, the content converter 351 retrieves session description information of the master version multicast stream from which the extremely low rate version multicast stream is generated (step S511). The content converter 351 newly generates session description information of the extremely low rate version multicast stream from the session description information of the master version multicast stream using a method described later (step S513). The generated session description information is then transferred to the lower router controller 40 (step S513) while being stored onto the content converter/content identifier storage 353 (step S513).

Upon receiving the session description information of the extremely low rate version multicast stream, the lower router controller 40 registers the extremely low rate version multicast stream over the access network 12B in the same manner as the master version multicast stream (step S515).

The content converter 351 references the content converter/content identifier storage 353 and notifies the individual content identifier storage 611 in the IPTV terminal 60 of the session description information of the generated extremely low rate version multicast stream (step S517). Upon receiving the session description information of the extremely low rate version multicast stream, the IPTV terminal 60 can execute the extremely low rate version multicast stream.

The generation process of the session description information of the extremely low rate version multicast stream is described in detail with reference to FIG. 23.

When converting the original multicast stream of the core network 12A into the extremely low rate version multicast stream, the content converter 351 also generates the session description information for use in participating in the multicast group corresponding to the extremely low rate version multicast stream. The multicast group (address) and the like contained in the session description information, different from the session description information of the original multicast stream, is newly generated by the content converter 351.

The session description information of the original multicast stream is stored together with the corresponding content identifier (CRID) on the master content identifier storage 541 on the IPTV server 50. When participating in the master multicast address over the core network 12A, the upper router controller 30 having the content converter 351 thereon recognizes a desired multicast address and thus notifies the content converter 351 of the multicast address.

Figure 23:
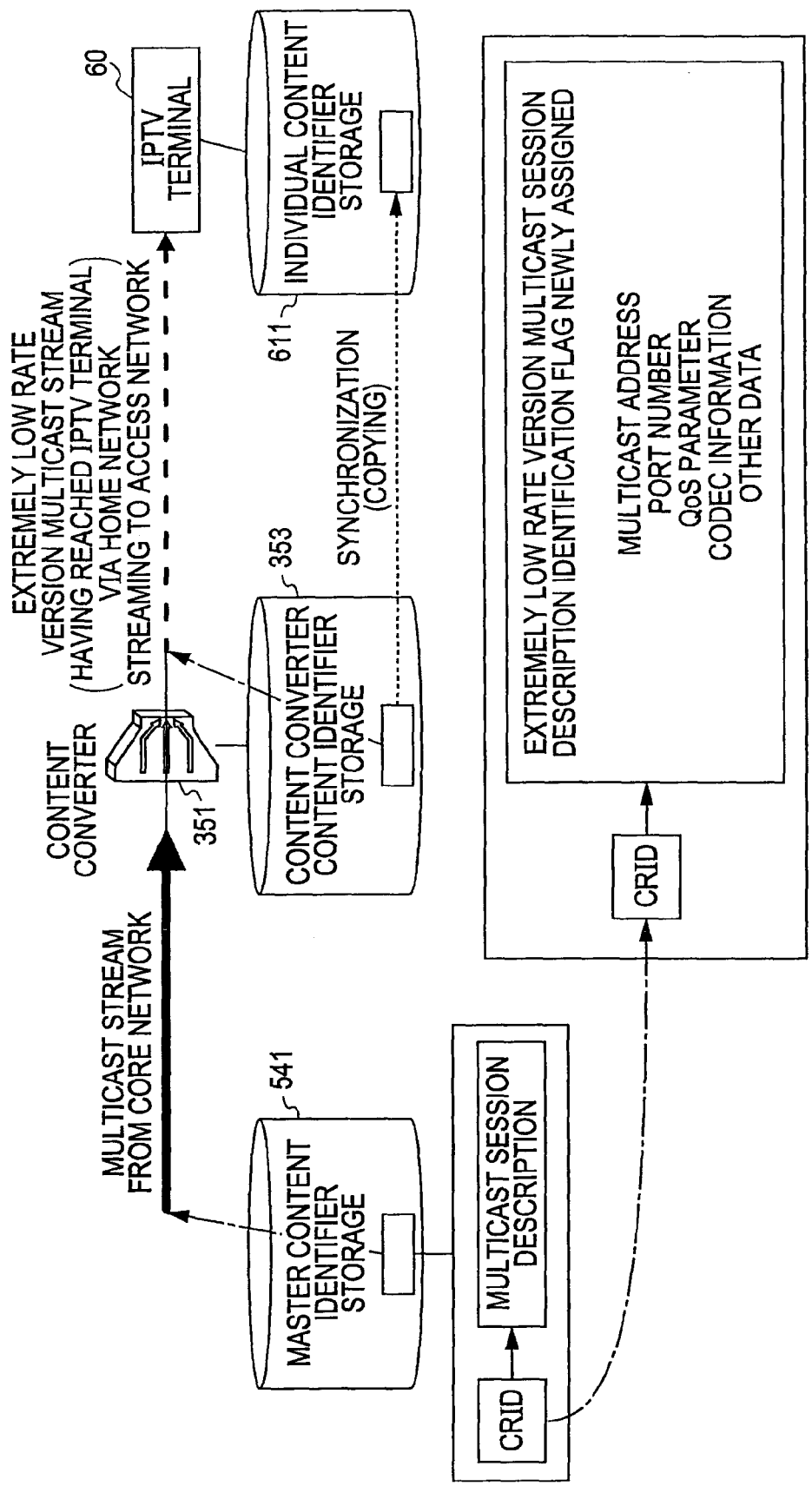
FIG. 23 illustrates the content converter in accordance with the second embodiment of the present invention.

As shown in FIG. 23, the content converter 351 retrieves the corresponding content identifier from the master content identifier storage 541 in accordance with the notified multicast address. The content converter 351 maps the retrieved content identifier to the session description information of the newly generated extremely low rate version multicast stream and then stores the identifier and multicast stream onto the content converter/content identifier storage 353. An identification flag is attached to the newly assigned session description to identify the extremely low rate version multicast stream.

The lower router controller 40 is also notified of the session description of the extremely low rate version multicast stream stored on the content converter/content identifier storage 353. The multicast booking unit 401 in the lower router controller 40 immediately registers the multicast stream.

The data stored on the content converter/content identifier storage 353 is all synchronized (copied) to the individual content identifier storage 611. If the capacity of the individual content identifier storage 611 is small, the optimization process of the individual content identifier storage 611 described in connection with the first embodiment is used to synchronize the data to the individual content identifier storage 611 in the IPTV terminal 60.

Figure 24:
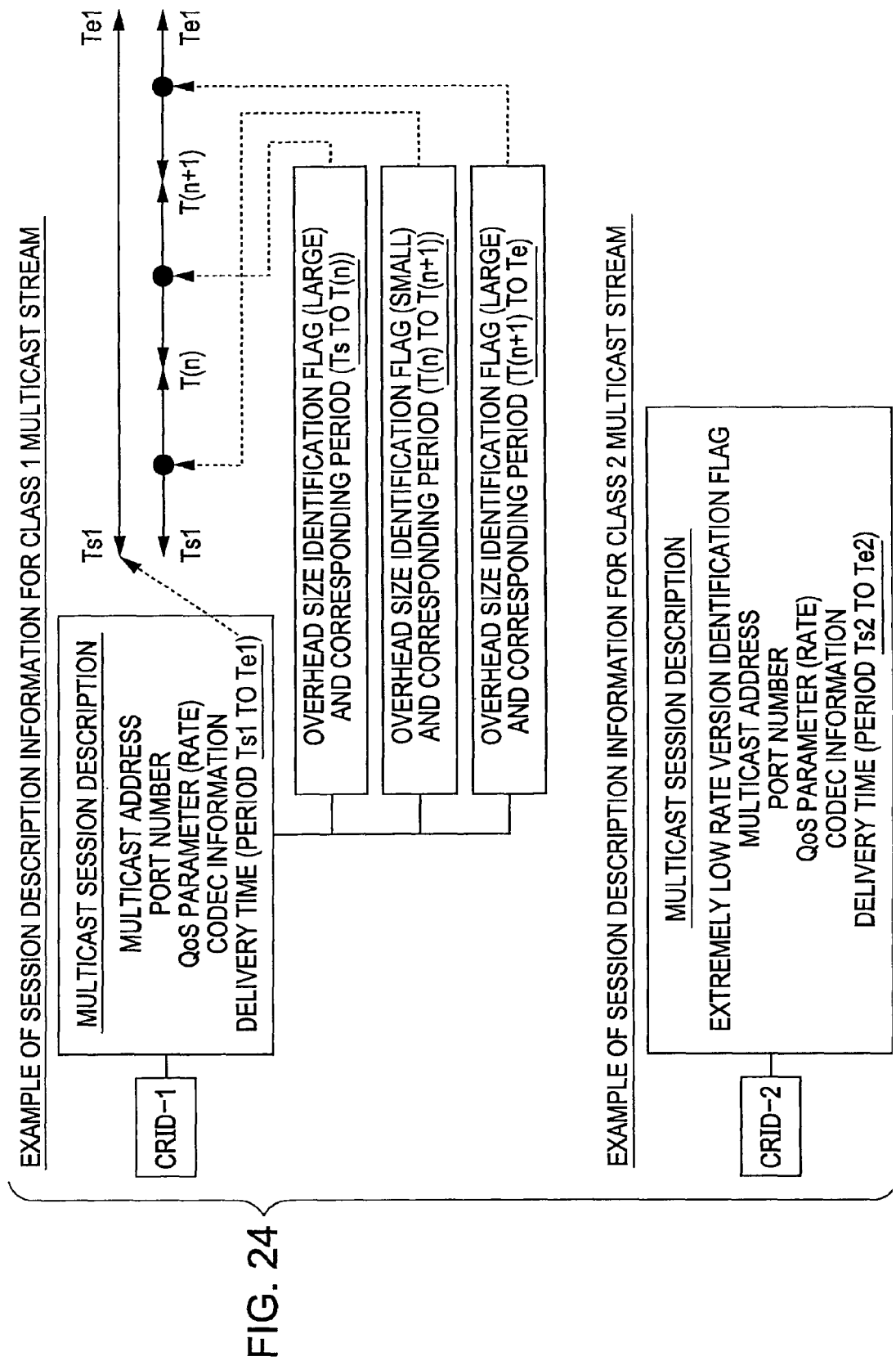
FIG. 24 illustrates multicast session description information in accordance with the second embodiment of the present invention.
Figure 25:
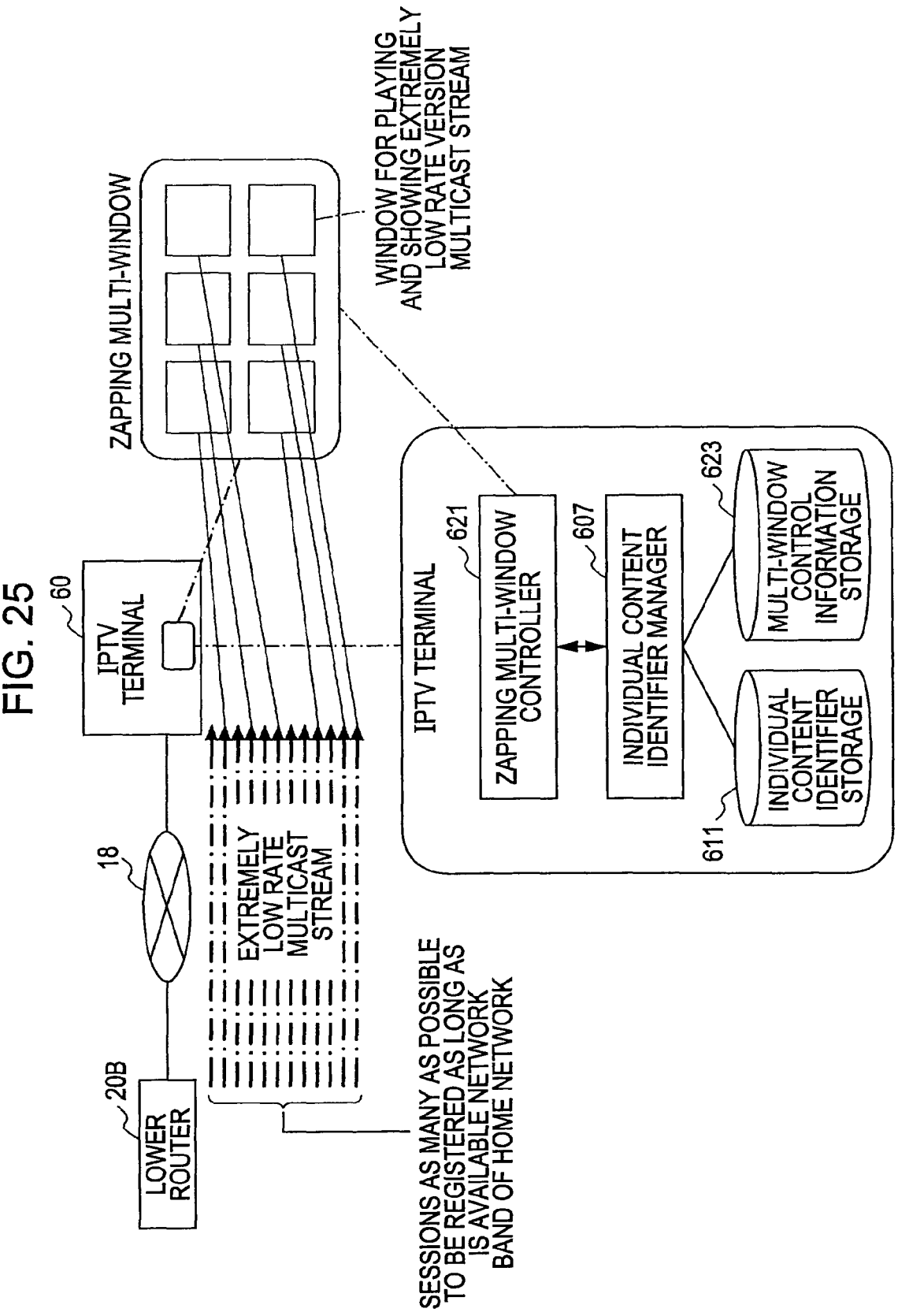
FIG. 25 illustrates a zapping multi-window in accordance with the second embodiment of the present invention.

The session description information of each class stored on the individual content identifier storage 611 in the IPTV terminal 60 is described with reference to FIG. 24.

The individual content identifier storage 611 stores the session description information corresponding to the master version multicast stream of the class 1 together with the session description information corresponding to the extremely low rate version multicast stream corresponding to the class 2. The session description information of the class 1 is optimized by the optimizer 535 in the IPTV server 50 and then the individual content identifier manager 607 in the IPTV terminal 60 attaches information such as the overhead identification flag to the optimized class 1 stream. The session description information of the class 2 is generated by the content converter 351 in the upper router controller 30.

The session description information of each class stored on the individual content identifier storage 611 is described with reference to FIG. 24. The session description information of each class is mapped to the corresponding content identifier (CRID). The session description information contains the multicast address corresponding to the content identifier, the port number, the QoS parameter, the codec information and the delivery time and period. As described with reference to the first embodiment of the present invention, the session description of the class 1 is mapped to the book scheduling period and the overhead size identification flag of channel switching.

On the other hand, an extremely low rate version identification flag indicating that an extremely low rate version multicast is added to the session description information of the class 2. But an overhead identification flag for the class 1 is not added. The class 2 session is always multicast booked over the access network 12B and it is guaranteed that the channel switching overhead is small.

As long as the communication network 18 in the home network 14 has an available network band, the lower router 20B of the second embodiment of the present invention registers the extremely low rate version multicast streams generated by the upper router 20A as many as possible. The zapping multi-window controller 621 in the IPTV terminal 60 receives the extremely low rate version multicast stream. The zapping multi-window controller 621 displays a plurality of received extremely low rate version multicast streams on the display of the IPTV terminal 60 based on the multi-window control information stored on the multi-window control information storage 623. The term zapping multi-window refers to a multi-window that displays the extremely low rate version multicast stream itself or attribute information of the multicast stream.

Figure 26:
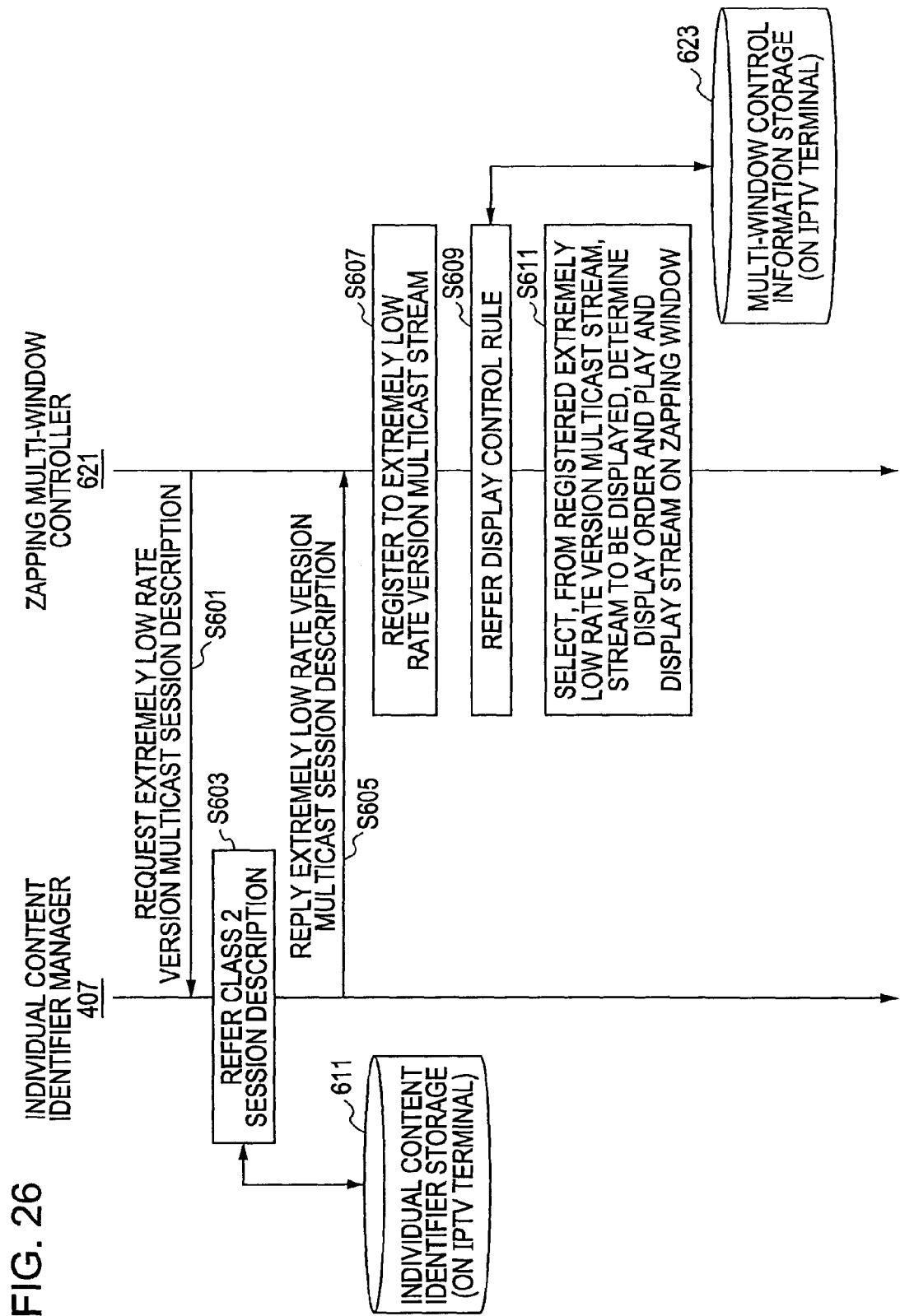
FIG. 26 illustrates a control method of the zapping multi-window in accordance with the second embodiment of the present invention.

A receiving method of the extremely low rate version multicast stream of the second embodiment of the present invention is described below with reference to FIG. 26.

The zapping multi-window controller 621 participates in the multicast group of the extremely low rate version multicast stream of the class 2 in order to obtain a zapping display stream. In response to the number of windows to be displayed on zapping multi-windows, the zapping multi-window controller 621 requests the extremely low rate version multicast session description information from the individual content identifier manager 607 (step S601). The individual content identifier manager 607 references the individual content identifier storage 611 and selects only an extremely low rate multicast session based on the extremely low rate version flag of the multicast session description information (step S603). The individual content identifier manager 607 replies the selected multicast session description information of the extremely low rate version to the zapping multi-window controller 621 (step S605).

Based on the obtained session description, the zapping multi-window controller 621 requests the extremely low rate version multicast session to be registered and then receives the extremely low rate version multicast stream (step S607). The extremely low rate version multicast stream is considered not to occupy greatly the network band and the lower router controller 40 performs the participation and registration process on the extremely low rate multicast streams as many as possible if the home network 14 has more available band.

The zapping multi-window controller 621 references the multi-window control information storage 623 in order to obtain the rule of reception and window display order (multi-window display control rule) according to which the extremely low rate version multicast session is selected (step S609). The multi-window display control rule is described below.

The zapping multi-window controller 621 selects a stream from among the extremely low rate version multicast streams in accordance with the multi-window display control rule to determine display order. The zapping multi-window controller 621 then plays and display the selected streams on the zapping multi-windows (step S611).

The individual content identifier storage 611 stores the session descriptions of the multicast streams corresponding to the class 1 and the class 2 satisfying the user's preference. As long as the capacity of the individual content identifier storage 611 permits, the individual content identifier storage 611 may store not only the session description satisfying the user's preference but also all registered sessions on the access network 12B in the lower router controller 40. The extremely low rate version multicast streams of the class 2 contain the one into which the master version multicast stream is converted.

The multi-window display control rule of the second embodiment of the present invention is specifically described below with reference to FIGS. 27A-27C.

The multi-window display control rule of the second embodiment includes a criterion according to which the order of the extremely low rate version multicast channels to be displayed on the multi-windows is determined and a criterion according to which an appearance such as a window outline is determined. The criteria for determining the order include a preference priority order of the user of the IPTV terminal 60 and the session order of the multicast registered streams over the home network. The criteria for determining the appearance of the window include the size of the channel switching overhead in the reception of the master version multicast stream (class 1), the color of the window outline to allow a plurality of classes to be distinctively displayed, the mode of display with the shape of the window changed, etc. A difference in the display mode allows the user to predict and compare the channel switching overhead. The zapping operation is thus efficiently performed.

FIG. 27A illustrates one example of display mode of zapping multi-windows in accordance with the second embodiment of the present invention. As shown in FIG. 27A, the master version multicast stream (multicast stream of the class 1) having undergone the participation and registration process in the lower router 20B as an immediately close multicast router may be displayed according to the user's preference order.

The immediately close lower router controller 40 performs the participation and registration process on the multicast streams assigned to the class 1 in accordance with the multicast book schedule as described above. Whether the channel belongs to the class 1 or not is determined by the time period corresponding to the overhead identification flag of the multicast session description stored on the individual content identifier storage 611. The zapping multi-window controller 621 references time and time period of the displaying of the zapping multi-windows and selects the multicast stream having a small overhead at the time. The display order is determined taking into consideration the user's preference level recorded on the individual content identifier storage 611. As shown in FIG. 27A, the user of the IPTV terminal 60 is notified of a small overhead by displaying a display outline of the small overhead in a color different from the other display outlines or highlighting the display outline of the small overhead. A master cast screen is then immediately displayed after selecting such a display with a small zapping overhead involved.

By adopting the above-referenced display control rule, the master version multicast streams are registered on the zapping multi-windows from the leftmost window in accordance with the user's preference order. The user of the IPTV terminal 60 can select a channel in the user's preference priority order with a small overhead in the channel switching involved in the reception of the master version multicast stream.

FIG. 27B illustrates one example of display mode of zapping multi-windows in accordance with the second embodiment of the present invention. As shown in FIG. 27B, the channels are displayed in the order of preference of the user of the IPTV terminal 60.

In accordance with the above-referenced multi-window display control rule, the multicast sessions of the class 2 multicast registered in the IPTV terminal 60 are displayed in the user's preference priority order recorded on the individual content identifier storage 611. In the same way as described above, the multicast sessions of the class 1 are highlighted. The highlighted sessions notify the user that the selection of the corresponding channel causes the master cast screen to be immediately displayed. The user is also notified that sessions that are not highlighted take time before the corresponding channels appear on the screen.

By adopting the above-referenced display control rule, the multicast contents are displayed on the zapping multi-windows from the leftmost window in accordance with the user's preference order regardless of whether the corresponding master version multicast contents have already been registered. The channel switching overhead is thus predicted and the user can select contents in the order of interest.

FIG. 27C illustrates one example of display mode of zapping multi-windows in accordance with the second embodiment of the present invention. As shown in FIG. 27c, the extremely low rate version multicast streams are displayed in a channel order (a horizontal row order) preset by a service provider, namely, the IPTV server 50.

Channel order information provided by the IPTV server 50 is supplied to the individual content identifier storage 611 as electronic program guide (EPG). In accordance with the multi-window display control rule, the zapping multi-window controller 621 can display the extremely low rate version multicast streams on the zapping multi-window display without performing an additional process. The workload on the zapping multi-window controller 621 is considered to be light.

With the above-referenced multi-window display control rule, the zapping multi-windows are displayed in the horizontal row order. If the user has already determined any multicast address as the one to view, the corresponding content is easily determined.

In the above discussion of the embodiments, moving images are displayed on the zapping multi-windows. Alternatively, still images or text may be displayed on the zapping multi-windows.

It should be understood by those skilled in the art that various modifications, combinations, sub-combinations and alterations may occur depending on design requirements and other factors insofar as they are within the scope of the appended claims or the equivalents thereof.

What is claimed is:

1. A multicasting system, comprising:
   a delivery server to multicast a content via at least one upper router and a plurality of lower routers;
   a plurality of client devices to play the content multicast by the delivery server; and
   an upper router controller to control the upper router, at least one of the client devices including
      an individual storage unit to store an identifier of at least part of the content to be multicast by the delivery server and session information related to multicasting of the content with the identifier mapped to the session information,
      a content retrieving unit to retrieve the content from the delivery server in accordance with the identifier and the session information of the content stored on the individual storage unit, and
      a content playing unit to play the retrieved content,
   the delivery server including a content delivery unit to deliver the content to the at least one of the client devices,
   the upper router controller including
      a session information retrieving unit to retrieve, from the at least one of the client devices, the session information of content to be multicast within a book scheduling period stored on the individual storage unit,
      a book scheduling unit to determine a priority order of multicast addresses within the book scheduling period in accordance with the retrieved session information and schedule, based on the determined priority order and a permitted workload of an access network connecting the upper router to the lower router, the multicast addresses in which each lower router participates within the book scheduling period to produce book scheduling results, and
      a schedule information notifier to notify the at least one of the client devices of the book scheduling results, and
   the at least one of the client devices further including
      a switch time addition unit to add, to the session information of the content stored on the individual storage unit, information relating to channel switch time of each content to be multicast within the book scheduling period in accordance with the book scheduling information, and a display controller to display a channel switch time of the content stored in the individual storage unit in a recognizable manner within the book scheduling period based on the information relating to channel switch time.

2. A client device receiving and playing content multicast from a delivery server via an upper router and a lower router, the client device comprising:

an individual content storage unit to store an identifier of at least part of the content to be multicast by the delivery server and session information related to multicasting of the content with the identifier mapped to the session information;

a content retrieving unit to retrieve the content from the delivery server in accordance with the identifier and the session information of the content stored on the individual storage unit;

a content playing unit to play the retrieved content;

a receiver to receive, from an upper router controller, book scheduling information representing results of scheduling of a multicast address in which the lower router participates within a book scheduling period, in accordance with a priority order of multicast addresses within the book scheduling period and a permitted workload of an access network connecting the upper router to the lower router, the priority order being determined in the upper router controller in accordance with session information of content to be multicast within the book scheduling period, the session information stored on the individual content storage unit;

a switch time addition unit to add, to the session information of the content stored on the individual storage unit, information relating to channel switch time of the content to be multicast within the book scheduling period in accordance with the book scheduling information; and a display controller to display a channel switch time of the content stored in the individual storage unit in a recognizable manner within the book scheduling period based on the information relating to channel switch time.

3. The client device according to claim 2, wherein
the display controller is further configured to display the channel switch time of the content stored in the individual storage unit in a recognizable manner by differentiating, in a display mode, a window for displaying attribute information of each content stored in the individual storage unit as a delivery target within the book scheduling period.

4. The client device according to claim 3, wherein
the display controller is further configured to display the window corresponding to each content stored in the individual storage unit in accordance with a length of the channel switch time.

5. The client device according to claim 3, wherein
the display controller is further configured to display the window corresponding to each content in an order of multicast addresses.

6. The client device according to claim 3, wherein
the display controller is further configured to display a moving image in each window.

7. The client device according to claim 6, wherein
the display controller is further configured to receive, from the upper router, content delivered from the delivery server and converted into a low quality content by the upper router, and to display the low image quality content on each window.

8. The client device according to claim 3, wherein
the display controller is further configured to display, on each window, a still image representing the content stored in the individual storage unit.

9. An upper router controller for controlling an upper router routing data between a delivery server and a plurality of client devices, the delivery server multicasting content via at least one upper router and a plurality of lower routers, the upper router controller comprising:

a session information retrieving unit to retrieve, from at least one of the client devices, session information of content to be multicast within a book scheduling period, the content to be multicast being highly likely to be executed by the at least one of the client devices;

a book scheduling unit to determine a priority order of multicast addresses within the book scheduling period in accordance with the retrieved session information and schedule, based on the determined priority order and a permitted workload of an access network connecting the upper router to the lower router, the multicast addresses in which each lower router participates within the book scheduling period to produce book scheduling results; and a schedule information notifier to notify a lower router controller of the book scheduling results.

10. The upper router controller according to claim 9, further comprising:

a content converter to convert content delivered from the delivery server to a content occupying a narrow delivery band.

11. The upper router controller according to claim 10, wherein
the content converter is further configured to generate new session information for the content occupying the narrow delivery band and transmit the new session information to the at least one of the client devices.

12. The upper router controller according to claim 11, wherein
the content converter is further configured to attach, to the new session information of the content occupying the narrow delivery band, information indicating the narrow delivery band.

13. The upper router controller according to claim 10, wherein
the content is video content including moving image data and audio data, and
the content converter is further configured to not convert the audio data and to reduce an amount of the moving image data.

14. A method of displaying a channel switch time in a recognizable manner in a client device retrieving content from a delivery server via a lower router and an upper router, the method comprising:

attaching, to multicast session information of content stored on the client device, flag information indicating a length of channel switch time of the content based on book scheduling information transmitted from an upper router controller controlling the upper router; and displaying the channel switch time of the content stored on the client device in a recognizable manner in accordance with the flag information indicating the length of channel switch time.

15. A non-transitory computer readable storage medium encoded with computer readable instructions that, when executed by an arithmetic processor, direct the arithmetic processor to execute a process to control a client device playing content multicast from a delivery server via an upper router, comprising:

storing an identifier of at least part of the content to be multicast by the delivery server and session information related to multicasting of the content with the identifier mapped to the session information;

retrieving the content from the delivery server in accordance with the identifier and the session information of the stored content;

playing the retrieved content;

receiving, from an upper router controller, book scheduling information representing results of scheduling of a multicast address in which a lower router participates within a book scheduling period, in accordance with a priority order of multicast addresses within the book scheduling period and a permitted workload of an access network connecting the upper router to the lower router, the priority order being determined in the upper router controller in accordance with session information of content to be multicast within the book scheduling period, the session information being stored on the client device;

adding, to the stored session information, information relating to channel switch time of the content to be multicast within the book scheduling period in accordance with the book scheduling information, and displaying a channel switch time of content in a recognizable manner within the book scheduling period based on the information relating to channel switch time.

16. A non-transitory computer readable storage medium encoded with computer readable instructions that, when executed by an arithmetic processor, direct the arithmetic processor to execute a process to control an upper router relaying a content multicast from a delivery server to a client device, comprising:

retrieving, from at least one of a plurality of client devices, session information of content to be multicast within a book scheduling period, the content to be multicast being highly likely to be executed by the at least one of the client devices;

determining a priority order of multicast addresses within the book scheduling period in accordance with the retrieved session information and scheduling, based on the determined priority order and a permitted workload of an access network connecting the upper router to the lower router, the multicast addresses in which each lower router participates within the book scheduling period to produce book scheduling results; and notifying a lower router controller of the book scheduling results.

\* \* \* \* \*